US010068406B1

(12) United States Patent
Jagielinski et al.

(10) Patent No.: US 10,068,406 B1
(45) Date of Patent: Sep. 4, 2018

(54) SYSTEMS, METHODS AND DEVICES FOR PROCESSING COINS WITH LINEAR ARRAY OF COIN IMAGING SENSORS

(71) Applicant: Cummins-Allison Corp., Mt. Prospect, IL (US)

(72) Inventors: Tomasz M. Jagielinski, Carlsbad, CA (US); Mathew Tomor, Escondido, CA (US); Araz Yacoubian, Carlsbad, CA (US); David J. Mecklenburg, Glendale Heights, IL (US); Danny D. Yang, San Diego, CA (US)

(73) Assignee: Cummins-Allison Corp., Mt. Prospect, IL (US)

( * ) Notice: Subject to any disclaimer, the term of this patent is extended or adjusted under 35 U.S.C. 154(b) by 0 days.

(21) Appl. No.: 15/835,989

(22) Filed: Dec. 8, 2017

Related U.S. Application Data

(63) Continuation of application No. 15/360,004, filed on Nov. 23, 2016, now Pat. No. 9,870,668, which is a
(Continued)

(51) Int. Cl.
*G07D 3/14* (2006.01)
*G07D 5/08* (2006.01)
(Continued)

(52) U.S. Cl.
CPC ............ *G07D 5/08* (2013.01); *G06K 9/209* (2013.01); *G07D 3/14* (2013.01); *G07D 11/0036* (2013.01)

(58) Field of Classification Search
CPC .......... G07D 3/00; G07D 3/14; G07D 5/005; G07D 5/08; G07D 11/0036; G06K 7/08; G06K 7/10; G06K 9/209; G06K 9/20
See application file for complete search history.

(56) References Cited

U.S. PATENT DOCUMENTS

| | | | |
|---|---|---|---|
| 1,099,706 A | 6/1914 | Lindeen | 141/298 |
| 2,570,920 A | 10/1951 | Clough et al. | 232/16 |

(Continued)

FOREIGN PATENT DOCUMENTS

| | | | | |
|---|---|---|---|---|
| CA | 2235925 C | 11/1995 | | G07D 9/00 |
| CA | 2189330 C | 12/2000 | | G07F 17/42 |

(Continued)

OTHER PUBLICATIONS

U.S. Appl. No. 14/804,670, Office Action, dated Mar. 17, 2016; (11 pages).
(Continued)

*Primary Examiner* — Mark J Beauchaine
(74) *Attorney, Agent, or Firm* — Greer, Burns & Crain, Ltd.

(57) ABSTRACT

Currency processing systems, coin processing machines, and methods of imaging coins are presented herein. A currency processing system is disclosed which includes a housing with a coin input area for receiving coins and coin receptacles for stowing processed coins. A disk-type coin processing unit is coupled to the coin input area and coin receptacles. The disk-type coin processing unit includes a rotatable disk for imparting motion to the coins, and a sorting head having a lower surface adjacent the rotatable disk. The lower surface forms various shaped regions for guiding the coins, under the motion imparted by the rotatable disk, to exit channels through which the coins are discharged to the coin receptacles. A linear array of sensors is mounted to the sorting head and/or the rotatable disk. The sensors examine each coin on the rotatable disk and output a signal indicative of coin image information for processing the coin.

22 Claims, 9 Drawing Sheets

Related U.S. Application Data continuation of application No. 14/804,670, filed on Jul. 21, 2015, now Pat. No. 9,508,208.

(60) Provisional application No. 62/029,195, filed on Jul. 25, 2014.

(51) Int. Cl.
    *G06K 9/20* (2006.01)
    *G07D 11/00* (2006.01)

(56) References Cited

U.S. PATENT DOCUMENTS

| | | | |
|---|---|---|---|
| 2,669,998 A | 2/1954 | Buchholz | 133/8 |
| 2,750,949 A | 6/1956 | Kulo et al. | 133/8 |
| 2,835,260 A | 5/1958 | Buchholz | 133/8 |
| 2,865,561 A | 12/1958 | Rosapepe | 232/7 |
| 3,132,654 A | 5/1964 | Adams | 133/1 |
| 3,376,970 A | 4/1968 | Roseberg | 198/40 |
| 3,771,583 A | 11/1973 | Bottemiller | 160/327 |
| 3,778,595 A | 12/1973 | Hatanaka et al. | 235/61.7 B |
| 3,851,755 A | 12/1974 | Hull et al. | 206/0.82 |
| 3,916,922 A | 11/1975 | Prumm | 133/3 R |
| 3,998,237 A | 12/1976 | Kressin | 133/3 A |
| 3,998,379 A | 12/1976 | Myers et al. | 229/33 |
| 4,050,218 A | 9/1977 | Call | 53/167 |
| 4,059,122 A | 11/1977 | Kinoshita | 133/3 D |
| 4,075,460 A | 2/1978 | Gorgens | 235/420 |
| 4,124,111 A | 11/1978 | Hayashi | 194/102 |
| 4,150,740 A | 4/1979 | Douno | 194/4 C |
| 4,166,945 A | 9/1979 | Inoyama et al. | 235/379 |
| 4,172,462 A | 10/1979 | Uchida et al. | 133/3 A |
| 4,179,685 A | 12/1979 | O'Maley | 340/146.3 H |
| 4,179,723 A | 12/1979 | Spencer | 361/384 |
| 4,184,366 A | 1/1980 | Butler | 73/163 |
| 4,197,986 A | 4/1980 | Nagata | 235/379 |
| 4,208,549 A | 6/1980 | Polillo et al. | 179/6.3 R |
| 4,228,812 A | 10/1980 | Marti | 133/3 F |
| 4,232,295 A | 11/1980 | McConnell | 340/152 R |
| 4,234,003 A | 11/1980 | Ristvedt et al. | 133/3 |
| 4,249,552 A | 2/1981 | Margolin et al. | 133/1 R |
| 4,251,867 A | 2/1981 | Uchida et al. | 364/408 |
| 4,286,703 A | 9/1981 | Schuller et al. | 194/100 A |
| RE30,773 E | 10/1981 | Glaser et al. | 235/379 |
| 4,310,885 A | 1/1982 | Azcua et al. | 364/405 |
| 4,317,957 A | 3/1982 | Sendrow | 178/22.08 |
| 4,341,951 A | 7/1982 | Benton | 235/379 |
| 4,355,369 A | 10/1982 | Garvin | 364/900 |
| 4,360,034 A | 11/1982 | Davila et al. | 133/3 D |
| 4,369,442 A | 1/1983 | Werth et al. | 340/825.35 |
| 4,380,316 A | 4/1983 | Glinka et al. | 232/16 |
| 4,383,540 A | 5/1983 | DeMeyer et al. | 133/3 H |
| 4,385,285 A | 5/1983 | Horst et al. | 382/3 |
| 4,412,292 A | 10/1983 | Sedam et al. | 364/479 |
| 4,416,299 A | 11/1983 | Bergman | 133/1 R |
| 4,417,136 A | 11/1983 | Rushby et al. | 235/379 |
| 4,423,316 A | 12/1983 | Sano et al. | 235/379 |
| 4,434,359 A | 2/1984 | Watanabe | 235/379 |
| 4,436,103 A | 3/1984 | Dick | 133/3 D |
| 4,454,414 A | 6/1984 | Benton | 235/379 |
| 4,474,197 A | 10/1984 | Kinoshita et al. | 133/4 A |
| 4,488,116 A | 12/1984 | Plesko | 324/236 |
| 4,531,531 A | 7/1985 | Johnson et al. | 133/3 |
| 4,542,287 A | 9/1985 | Watanabe | 235/379 |
| 4,543,969 A | 10/1985 | Rasmussen | 133/3 |
| 4,549,561 A | 10/1985 | Johnson et al. | 133/3 |
| 4,556,140 A | 12/1985 | Okada | 194/4 C |
| 4,558,711 A | 12/1985 | Yoshiaki et al. | 133/3 F |
| 4,564,036 A | 1/1986 | Ristvedt | 133/3 |
| 4,570,655 A | 2/1986 | Raterman | 133/3 |
| 4,594,664 A | 6/1986 | Hashimoto | 364/405 |
| 4,602,332 A | 7/1986 | Hirose et al. | 364/408 |
| 4,607,649 A | 8/1986 | Taipale et al. | 133/3 C |
| 4,620,559 A | 11/1986 | Childers et al. | 133/3 R |
| 4,641,239 A | 2/1987 | Takesako | 364/408 |
| 4,674,260 A | 6/1987 | Rasmussen et al. | 53/212 |
| 4,681,128 A | 7/1987 | Ristvedt et al. | 453/6 |
| 4,705,154 A | 11/1987 | Masho et al. | 194/319 |
| 4,718,218 A | 1/1988 | Ristvedt | 53/532 |
| 4,731,043 A | 3/1988 | Ristvedt et al. | 453/6 |
| 4,733,765 A | 3/1988 | Watanabe | 194/206 |
| 4,749,074 A | 6/1988 | Ueki et al. | 194/317 |
| 4,753,624 A | 6/1988 | Adams et al. | 453/10 |
| 4,753,625 A | 6/1988 | Okada | 453/32 |
| 4,765,464 A | 8/1988 | Ristvedt | 206/0.82 |
| 4,766,548 A | 8/1988 | Cedrone et al. | 364/479 |
| 4,775,353 A | 10/1988 | Childers et al. | 453/6 |
| 4,775,354 A | 10/1988 | Rasmussen et al. | 453/10 |
| 4,778,983 A | 10/1988 | Ushikubo | 235/381 |
| 4,803,347 A | 2/1989 | Sugahara et al. | 235/379 |
| 4,804,830 A | 2/1989 | Miyagisima et al. | 235/379 |
| 4,812,629 A | 3/1989 | O'Neil et al. | 235/383 |
| 4,839,505 A | 6/1989 | Bradt et al. | 235/381 |
| 4,840,290 A | 6/1989 | Nakamura | 221/10 |
| 4,844,369 A | 7/1989 | Kanayachi | 242/56 R |
| 4,848,556 A | 7/1989 | Shah et al. | 194/212 |
| 4,863,414 A | 9/1989 | Ristvedt et al. | 453/6 |
| 4,883,158 A | 11/1989 | Kobayashi et al. | 194/217 |
| 4,884,212 A | 11/1989 | Stutsman | 364/479 |
| 4,900,909 A | 2/1990 | Nagashima et al. | 235/487 |
| 4,908,516 A | 3/1990 | West | 250/556 |
| 4,921,463 A | 5/1990 | Primdahl et al. | 453/3 |
| 4,936,435 A | 6/1990 | Griner | 194/317 |
| 4,953,086 A | 8/1990 | Fukatsu | 364/408 |
| 4,954,697 A | 9/1990 | Kokubun et al. | 235/381 |
| 4,964,495 A | 10/1990 | Rasmussen | 194/344 |
| 4,966,570 A | 10/1990 | Ristvedt et al. | 453/6 |
| 4,970,655 A | 11/1990 | Winn et al. | 364/479 |
| 4,971,187 A | 11/1990 | Furuya et al. | 194/318 |
| 4,988,849 A | 1/1991 | Sasaki et al. | 235/379 |
| 4,992,647 A | 2/1991 | Konishi et al. | 235/379 |
| 4,995,848 A | 2/1991 | Goh | 453/3 |
| 5,009,627 A | 4/1991 | Rasmussen | 453/10 |
| 5,010,238 A | 4/1991 | Kadono et al. | 235/379 |
| 5,010,485 A | 4/1991 | Bigari | 364/408 |
| 5,011,455 A | 4/1991 | Rasmussen | 453/10 |
| 5,022,889 A | 6/1991 | Ristvedt et al. | 453/6 |
| 5,025,139 A | 6/1991 | Halliburton, Jr. | 235/379 |
| 5,026,320 A | 6/1991 | Rasmussen | 453/6 |
| 5,031,098 A | 7/1991 | Miller et al. | 364/405 |
| 5,033,602 A | 7/1991 | Saarinen et al. | 194/334 |
| 5,039,848 A | 8/1991 | Stoken | 235/381 |
| 5,055,086 A | 10/1991 | Raterman et al. | 453/10 |
| 5,055,657 A | 10/1991 | Miller et al. | 235/381 |
| 5,056,643 A | 10/1991 | Kirberg | 194/202 |
| 5,064,999 A | 11/1991 | Okamoto et al. | 235/379 |
| 5,067,928 A | 11/1991 | Harris | 453/17 |
| 5,080,633 A | 1/1992 | Ristvedt et al. | 435/6 |
| 5,091,713 A | 2/1992 | Horne et al. | 340/541 |
| 5,104,353 A | 4/1992 | Ristvedt et al. | 453/6 |
| 5,105,601 A | 4/1992 | Horiguchi et al. | 53/465 |
| 5,106,338 A | 4/1992 | Rasmussen et al. | 453/10 |
| 5,111,927 A | 5/1992 | Schulze | 194/209 |
| 5,114,381 A | 5/1992 | Ueda et al. | 453/57 |
| 5,120,945 A | 6/1992 | Nishibe et al. | 235/379 |
| 5,123,873 A | 6/1992 | Rasmussen | 453/10 |
| 5,129,205 A | 7/1992 | Rasmussen | 53/52 |
| 5,135,435 A | 8/1992 | Rasmussen | 453/56 |
| 5,140,517 A | 8/1992 | Nagata et al. | 364/408 |
| 5,141,443 A | 8/1992 | Rasmussen et al. | 453/10 |
| 5,141,472 A | 8/1992 | Todd et al. | 453/10 |
| 5,145,455 A | 9/1992 | Todd | 453/6 |
| 5,146,067 A | 9/1992 | Sloan et al. | 235/381 |
| 5,154,272 A | 10/1992 | Nishiumi et al. | 194/318 |
| 5,163,866 A | 11/1992 | Rasmussen | 453/10 |
| 5,163,867 A | 11/1992 | Rasmussen | 453/10 |
| 5,163,868 A | 11/1992 | Adams et al. | 453/11 |
| 5,167,313 A | 12/1992 | Dobbins et al. | 194/317 |
| 5,175,416 A | 12/1992 | Mansvelt et al. | 235/379 |
| 5,176,565 A | 1/1993 | Ristvedt et al. | 453/6 |
| 5,179,517 A | 1/1993 | Saibin et al. | 364/410 |
| 5,183,142 A | 2/1993 | Latchinian et al. | 194/206 |
| 5,184,709 A | 2/1993 | Nishiumi et al. | 194/318 |
| 5,194,037 A | 3/1993 | Jones et al. | 453/10 |

(56) References Cited

U.S. PATENT DOCUMENTS

| | | | |
|---|---|---|---|
| 5,197,919 A | 3/1993 | Geib et al. ............... 453/10 |
| 5,205,780 A | 4/1993 | Rasmussen ............... 453/10 |
| 5,207,784 A | 5/1993 | Schwartzendruber ......... 221/6 |
| 5,209,696 A | 5/1993 | Rasmussen et al. ......... 453/10 |
| 5,236,071 A | 8/1993 | Lee ..................... 194/200 |
| 5,243,174 A | 9/1993 | Veeneman et al. ......... 235/381 |
| 5,251,738 A | 10/1993 | Dabrowski ............... 194/206 |
| 5,252,811 A | 10/1993 | Henochowicz et al. ...... 235/379 |
| 5,253,167 A | 10/1993 | Yoshida et al. .......... 364/408 |
| 5,259,491 A | 11/1993 | Ward, II ................ 194/350 |
| 5,263,566 A | 11/1993 | Nara et al. ............. 194/318 |
| 5,265,874 A | 11/1993 | Dickinson et al. ....... 273/138 A |
| 5,268,561 A | 12/1993 | Kimura et al. ........... 235/384 |
| 5,277,651 A | 1/1994 | Rasmussen et al. ......... 453/10 |
| 5,282,127 A | 1/1994 | Mii ..................... 364/130 |
| 5,286,226 A | 2/1994 | Rasmussen ............... 453/10 |
| 5,286,954 A | 2/1994 | Sato et al. ............. 235/379 |
| 5,291,003 A | 3/1994 | Avnet et al. ............ 235/381 |
| 5,291,560 A | 3/1994 | Daugman .................. 382/2 |
| 5,293,981 A | 3/1994 | Abe et al. .............. 194/345 |
| 5,297,030 A | 3/1994 | Vassigh et al. .......... 364/405 |
| 5,297,598 A | 3/1994 | Rasmussen ............... 141/314 |
| 5,297,986 A | 3/1994 | Ristvedt et al. .......... 453/6 |
| 5,299,977 A | 4/1994 | Mazur et al. ............. 453/10 |
| 5,302,811 A | 4/1994 | Fukatsu ................. 235/381 |
| 5,324,922 A | 6/1994 | Roberts ................. 235/375 |
| 5,326,104 A | 7/1994 | Pease et al. ........... 273/138 A |
| 5,370,575 A | 12/1994 | Geib et al. ............... 453/3 |
| 5,372,542 A | 12/1994 | Geib et al. .............. 453/10 |
| 5,374,814 A | 12/1994 | Kako et al. ............. 235/379 |
| 5,379,344 A | 1/1995 | Larson et al. ............ 380/23 |
| 5,379,875 A | 1/1995 | Shames et al. ........... 194/317 |
| 5,382,191 A | 1/1995 | Rasmussen ............... 453/11 |
| 5,390,776 A | 2/1995 | Thompson ................ 194/346 |
| 5,401,211 A | 3/1995 | Geib et al. .............. 453/10 |
| 5,404,986 A | 4/1995 | Hossfield et al. ........ 194/317 |
| 5,410,590 A | 4/1995 | Blood et al. ............ 379/147 |
| RE34,934 E | 5/1995 | Raterman et al. ........... 453/10 |
| 5,425,669 A | 6/1995 | Geib et al. .............. 453/10 |
| 5,429,550 A | 7/1995 | Mazur et al. ............. 453/10 |
| 5,440,108 A | 8/1995 | Tran et al. ............. 235/381 |
| 5,443,419 A | 8/1995 | Adams et al. ............. 453/17 |
| 5,450,938 A | 9/1995 | Rademacher .............. 194/206 |
| 5,453,047 A | 9/1995 | Mazur et al. ............. 453/10 |
| 5,458,285 A | 10/1995 | Remien ................... 232/15 |
| 5,468,182 A | 11/1995 | Geib .................... 453/10 |
| 5,470,079 A | 11/1995 | Lestmnge et al. ........ 273/138 A |
| 5,474,495 A | 12/1995 | Geib et al. ............... 453/3 |
| 5,474,497 A | 12/1995 | Jones et al. ............. 453/17 |
| 5,480,348 A | 1/1996 | Mazur et al. ............. 453/10 |
| 5,489,237 A | 2/1996 | Geib et al. .............. 453/12 |
| 5,500,514 A | 3/1996 | Veeneman et al. ......... 235/381 |
| 5,501,631 A | 3/1996 | Mennie et al. ............. 453/3 |
| 5,507,379 A | 4/1996 | Mazur et al. ............ 194/318 |
| 5,514,034 A | 5/1996 | Jones et al. ............. 453/10 |
| 5,520,577 A | 5/1996 | Rasmussen ............... 453/56 |
| 5,531,309 A | 7/1996 | Kloss et al. ............ 194/202 |
| 5,538,468 A | 7/1996 | Ristvedt et al. ........... 453/3 |
| 5,542,880 A | 8/1996 | Geib et al. .............. 453/10 |
| 5,542,881 A | 8/1996 | Geib .................... 453/10 |
| 5,553,320 A | 9/1996 | Matsuura et al. ......... 235/379 |
| 5,559,887 A | 9/1996 | Davis et al. ............. 380/24 |
| 5,564,546 A | 10/1996 | Molbak et al. ........... 194/216 |
| 5,564,974 A | 10/1996 | Mazur et al. ............. 453/10 |
| 5,564,978 A | 10/1996 | Jones et al. ............. 453/17 |
| 5,570,465 A | 10/1996 | Tsakanikas .............. 395/114 |
| 5,573,457 A | 11/1996 | Watts et al. ............. 453/31 |
| 5,584,758 A | 12/1996 | Geib .................... 453/10 |
| 5,592,377 A | 1/1997 | Lipkin .................. 395/242 |
| 5,602,933 A | 2/1997 | Blackwell et al. ........ 382/116 |
| 5,615,625 A | 4/1997 | Cassidy et al. ........... 109/45 |
| 5,620,079 A | 4/1997 | Molbak .................. 194/217 |
| 5,623,547 A | 4/1997 | Jones et al. ............. 380/24 |
| 5,625,562 A | 4/1997 | Veeneman et al. ...... 364/479.05 |
| 5,630,494 A | 5/1997 | Strauts ................. 194/317 |
| 5,641,050 A | 6/1997 | Smith et al. ............ 194/210 |
| 5,650,605 A | 7/1997 | Morioka et al. .......... 235/379 |
| 5,650,761 A | 7/1997 | Gomm et al. ............. 235/381 |
| 5,652,421 A | 7/1997 | Veeneman et al. ......... 235/381 |
| 5,665,952 A | 9/1997 | Ziarno .................. 235/380 |
| 5,679,070 A | 10/1997 | Ishida et al. ............ 453/41 |
| 5,684,597 A | 11/1997 | Hossfield et al. ........ 356/384 |
| 5,696,366 A | 12/1997 | Ziarno .................. 235/380 |
| 5,743,373 A | 4/1998 | Strauts ................. 194/318 |
| 5,746,299 A | 5/1998 | Molbak et al. ........... 194/200 |
| 5,774,874 A | 6/1998 | Veeneman et al. .......... 705/27 |
| 5,782,686 A | 7/1998 | Geib et al. .............. 453/10 |
| 5,799,767 A | 9/1998 | Molbak .................. 194/217 |
| 5,813,510 A | 9/1998 | Rademacher .............. 194/206 |
| 5,823,315 A | 10/1998 | Hoffman et al. .......... 194/203 |
| 5,830,054 A | 11/1998 | Petri ..................... 453/5 |
| 5,838,812 A | 11/1998 | Pare, Jr. et al. ........ 382/115 |
| 5,842,188 A | 11/1998 | Ramsey et al. ........... 705/416 |
| 5,842,916 A | 12/1998 | Gerrity et al. ........... 453/57 |
| 5,850,076 A | 12/1998 | Morioka et al. .......... 235/379 |
| 5,854,581 A | 12/1998 | Mori et al. ............. 235/379 |
| 5,865,673 A | 2/1999 | Geib et al. .............. 453/10 |
| 5,875,879 A | 3/1999 | Hawthorn ................ 194/350 |
| 5,880,444 A | 3/1999 | Shibata et al. .......... 235/379 |
| 5,892,211 A | 4/1999 | Davis et al. ............ 235/380 |
| 5,892,827 A | 4/1999 | Beach et al. ............. 380/24 |
| 5,909,793 A | 6/1999 | Beach et al. ............ 194/210 |
| 5,909,794 A | 6/1999 | Molbak et al. ........... 194/216 |
| 5,913,399 A | 6/1999 | Takemoto et al. ......... 194/200 |
| 5,918,748 A | 7/1999 | Clark et al. ............ 209/534 |
| 5,940,623 A | 8/1999 | Watts et al. ............ 395/712 |
| 5,941,364 A | 8/1999 | Wei ..................... 194/350 |
| 5,944,162 A | 8/1999 | Filiberti ............... 194/204 |
| 5,944,600 A | 8/1999 | Zimmermann .............. 435/10 |
| 5,944,601 A | 8/1999 | Hayashi et al. ........... 453/61 |
| 5,951,476 A | 9/1999 | Beach et al. ............ 600/437 |
| 5,957,262 A | 9/1999 | Molbak et al. ........... 194/200 |
| 5,988,348 A | 11/1999 | Martin et al. ........... 194/317 |
| 5,995,949 A | 11/1999 | Morioka et al. ........... 705/43 |
| 5,997,395 A | 12/1999 | Geib et al. .............. 453/10 |
| 6,017,270 A | 1/2000 | Ristvedt et al. ........... 453/5 |
| 6,021,883 A | 2/2000 | Casanova et al. ......... 194/217 |
| 6,032,859 A | 3/2000 | Muehlberger et al. ...... 235/449 |
| 6,039,644 A | 3/2000 | Geib et al. .............. 453/10 |
| 6,039,645 A | 3/2000 | Mazur ................... 453/10 |
| 6,042,470 A | 3/2000 | Geib et al. .............. 453/10 |
| 6,047,807 A | 4/2000 | Molbak .................. 194/217 |
| 6,047,808 A | 4/2000 | Neubarth et al. ......... 194/317 |
| 6,056,104 A | 5/2000 | Neubarth et al. ......... 194/317 |
| 6,068,194 A | 5/2000 | Mazur ................... 235/492 |
| 6,080,056 A | 6/2000 | Karlsson .................. 453/3 |
| 6,082,519 A | 7/2000 | Martin et al. ........... 194/350 |
| 6,086,471 A | 7/2000 | Zimmermann ............... 453/3 |
| 6,095,313 A | 8/2000 | Molbak et al. ........... 194/344 |
| 6,116,402 A | 9/2000 | Beach et al. ............ 194/216 |
| 6,131,625 A | 10/2000 | Casanova et al. ......... 141/314 |
| 6,139,418 A | 10/2000 | Geib et al. .............. 453/10 |
| 6,142,285 A | 11/2000 | Panzeri et al. .......... 194/328 |
| 6,145,738 A | 11/2000 | Stinson et al. .......... 235/379 |
| 6,154,879 A | 11/2000 | Pare, Jr. et al. .......... 902/3 |
| 6,168,001 B1 | 1/2001 | Davis ................... 194/200 |
| 6,171,182 B1 | 1/2001 | Geib et al. .............. 453/10 |
| 6,174,230 B1 | 1/2001 | Gerrity et al. ........... 453/57 |
| 6,196,371 B1 | 3/2001 | Martin et al. ........... 194/317 |
| 6,196,913 B1 | 3/2001 | Geib et al. .............. 453/10 |
| 6,202,006 B1 | 3/2001 | Scott ................... 700/231 |
| 6,213,277 B1 | 4/2001 | Blad et al. ............. 194/350 |
| 6,230,928 B1 | 5/2001 | Hanna et al. ............. 221/13 |
| 6,264,545 B1 | 7/2001 | Magee et al. .............. 453/3 |
| 6,308,887 B1 | 10/2001 | Korman et al. ........... 235/379 |
| 6,318,536 B1 | 11/2001 | Korman et al. ........... 194/217 |
| 6,318,537 B1 | 11/2001 | Jones et al. ............ 194/346 |
| 6,340,082 B1 | 1/2002 | House ................... 194/317 |
| 6,349,972 B1 | 2/2002 | Geiger et al. ............ 283/67 |
| 6,386,323 B1 | 5/2002 | Ramachandran et al. ...... 186/36 |
| 6,412,620 B1 | 7/2002 | Imura ................... 194/317 |
| 6,431,342 B1 | 8/2002 | Schwartz ................ 194/346 |
| 6,438,230 B1 | 8/2002 | Moore .................... 380/42 |
| 6,456,928 B1 | 9/2002 | Johnson ................. 701/114 |

(56) References Cited

U.S. PATENT DOCUMENTS

| | | | |
|---|---|---|---|
| 6,471,030 B1 | 10/2002 | Neubarth et al. | 194/317 |
| 6,474,548 B1 | 11/2002 | Montross et al. | 235/379 |
| 6,484,863 B1 | 11/2002 | Molbak | 194/216 |
| 6,484,884 B1 | 11/2002 | Gerrity et al. | 209/233 |
| 6,494,776 B1 | 12/2002 | Molbak | 453/32 |
| 6,499,277 B1 | 12/2002 | Warner et al. | 53/447 |
| 6,503,138 B2 | 1/2003 | Spoehr et al. | 453/10 |
| 6,520,308 B1 | 2/2003 | Martin et al. | 194/317 |
| 6,522,772 B1 | 2/2003 | Morrison et al. | 382/124 |
| 6,547,131 B1 | 4/2003 | Foodman et al. | 235/380 |
| 6,552,781 B1 | 4/2003 | Rompel et al. | 256/71 |
| 6,554,185 B1 | 4/2003 | Montross et al. | 235/379 |
| 6,579,165 B1 | 6/2003 | Kuhlin et al. | 453/3 |
| 6,581,042 B2 | 6/2003 | Pare, Jr. et al. | 705/40 |
| 6,602,125 B2 | 8/2003 | Martin | 453/12 |
| 6,609,604 B1 | 8/2003 | Jones et al. | 194/302 |
| 6,612,921 B2 | 9/2003 | Geib et al. | 453/13 |
| 6,637,576 B1 | 10/2003 | Jones et al. | 194/216 |
| 6,640,956 B1 | 11/2003 | Zwieg et al. | 194/328 |
| 6,644,696 B2 | 11/2003 | Brown et al. | 283/67 |
| 6,652,380 B1 | 11/2003 | Luciano | 463/25 |
| 6,655,585 B2 | 12/2003 | Shinn | 235/382 |
| 6,659,259 B2 | 12/2003 | Knox et al. | 194/217 |
| 6,662,166 B2 | 12/2003 | Pare, Jr. et al. | 705/39 |
| 6,663,675 B2 | 12/2003 | Blake et al. | 753/63 |
| 6,666,318 B2 | 12/2003 | Gerrity et al. | 194/347 |
| 6,688,449 B1 * | 2/2004 | Yamagishi | G07D 5/005 194/303 |
| 6,719,121 B2 | 4/2004 | Alexander et al. | 194/350 |
| 6,755,730 B2 | 6/2004 | Geib et al. | 453/3 |
| 6,758,316 B2 | 7/2004 | Molbak | 194/200 |
| 6,761,308 B1 | 7/2004 | Hanna et al. | 235/379 |
| 6,766,892 B2 | 7/2004 | Martin et al. | 194/317 |
| 6,783,452 B2 | 8/2004 | Hino et al. | 453/3 |
| 6,786,398 B1 | 9/2004 | Stinson et al. | 235/379 |
| 6,854,581 B2 | 2/2005 | Molbak | 194/344 |
| 6,854,640 B2 | 2/2005 | Peklo | 235/100 |
| 6,863,168 B1 | 3/2005 | Gerrity et al. | 194/347 |
| 6,892,871 B2 | 5/2005 | Strauts et al. | 194/302 |
| 6,896,118 B2 | 5/2005 | Jones et al. | 194/217 |
| 6,928,546 B1 | 8/2005 | Nanavati et al. | 713/186 |
| 6,950,810 B2 | 9/2005 | Lapsley et al. | 705/78 |
| 6,953,150 B2 | 10/2005 | Shepley et al. | 235/379 |
| 6,957,746 B2 | 10/2005 | Martin et al. | 221/131 |
| 6,966,417 B2 | 11/2005 | Peklo et al. | 194/344 |
| 6,976,570 B2 | 12/2005 | Molbak | 194/215 |
| 6,988,606 B2 | 1/2006 | Geib et al. | 194/334 |
| 6,991,530 B2 | 1/2006 | Hino et al. | 453/3 |
| 7,004,831 B2 | 2/2006 | Hino et al. | 453/5 |
| 7,014,029 B2 | 3/2006 | Winters | 194/302 |
| 7,014,108 B2 | 3/2006 | Sorenson et al. | 235/381 |
| 7,017,729 B2 | 3/2006 | Gerrity et al. | 194/347 |
| 7,018,286 B2 | 3/2006 | Blake et al. | 453/61 |
| 7,028,827 B1 | 4/2006 | Molbak et al. | 194/346 |
| 7,036,651 B2 | 5/2006 | Tam et al. | 194/217 |
| 7,083,036 B2 | 8/2006 | Adams | 194/223 |
| 7,113,929 B1 | 9/2006 | Beach et al. | 705/65 |
| 7,131,580 B2 | 11/2006 | Molbak | 235/379 |
| 7,149,336 B2 | 12/2006 | Jones et al. | 382/135 |
| 7,152,727 B2 | 12/2006 | Waechter | 194/317 |
| 7,158,662 B2 | 1/2007 | Chiles | 382/135 |
| 7,188,720 B2 | 3/2007 | Geib et al. | 194/302 |
| 7,213,697 B2 | 5/2007 | Martin et al. | 194/317 |
| 7,225,911 B2 | 6/2007 | Yokoi | 194/205 |
| 7,243,773 B2 | 7/2007 | Bochonok et al. | 194/350 |
| 7,269,279 B2 | 9/2007 | Chiles | 382/135 |
| 7,303,119 B2 | 12/2007 | Molbak | 235/379 |
| 7,331,521 B2 | 2/2008 | Sorenson et al. | 235/381 |
| 7,337,890 B2 | 3/2008 | Bochonok et al. | 194/353 |
| 7,427,230 B2 | 9/2008 | Blake et al. | 453/63 |
| 7,438,172 B2 | 10/2008 | Long et al. | 194/347 |
| 7,464,802 B2 | 12/2008 | Gerrity et al. | 194/347 |
| 7,500,568 B2 | 3/2009 | Cousin | 209/534 |
| 7,520,374 B2 | 4/2009 | Martin et al. | 194/317 |
| 7,551,764 B2 | 6/2009 | Chiles et al. | 382/135 |
| 7,552,810 B2 | 6/2009 | Mecklenburg | 194/317 |
| 7,580,859 B2 | 8/2009 | Economy | 705/16 |
| 7,604,107 B2 | 10/2009 | Richard et al. | 194/351 |
| 7,654,450 B2 | 2/2010 | Mateen et al. | 235/379 |
| 7,658,270 B2 | 2/2010 | Bochonok et al. | 194/350 |
| 7,735,125 B1 | 6/2010 | Alvarez et al. | 726/9 |
| 7,743,902 B2 | 6/2010 | Wendell et al. | 194/302 |
| 7,778,456 B2 | 8/2010 | Jones et al. | 382/135 |
| 7,819,308 B2 | 10/2010 | Osterberg et al. | 235/379 |
| 7,874,478 B2 | 1/2011 | Molbak | 235/379 |
| 7,886,890 B2 | 2/2011 | Blake et al. | 194/347 |
| 7,931,304 B2 | 4/2011 | Brown et al. | 283/57 |
| 7,946,406 B2 | 5/2011 | Blake et al. | 194/200 |
| 7,949,582 B2 | 5/2011 | Mennie et al. | 705/35 |
| 7,963,382 B2 | 6/2011 | Wendell et al. | 194/302 |
| 7,980,378 B2 | 7/2011 | Jones et al. | 194/217 |
| 8,023,715 B2 | 9/2011 | Jones et al. | 382/135 |
| 8,042,732 B2 | 10/2011 | Blake et al. | 235/375 |
| 8,202,144 B2 | 6/2012 | Hino | 453/6 |
| 8,229,821 B2 | 7/2012 | Mennie et al. | 232/16 |
| 8,346,610 B2 | 1/2013 | Mennie et al. | 705/16 |
| 8,352,322 B2 | 1/2013 | Mennie et al. | 705/16 |
| 8,393,455 B2 | 3/2013 | Blake et al. | 194/350 |
| 8,443,958 B2 | 5/2013 | Jones et al. | 194/215 |
| RE44,252 E | 6/2013 | Jones et al. | 194/217 |
| 8,523,641 B2 | 9/2013 | Kuykendall et al. | 194/217 |
| 8,545,295 B2 | 10/2013 | Blake et al. | 453/4 |
| 8,602,200 B2 | 12/2013 | Blake | 194/216 |
| 8,607,957 B2 | 12/2013 | Blake et al. | 194/344 |
| 8,616,359 B2 | 12/2013 | Bochonok et al. | 194/202 |
| RE44,689 E | 1/2014 | Wendell et al. | 194/302 |
| 8,684,159 B2 | 4/2014 | Blake | 194/216 |
| 8,684,160 B2 | 4/2014 | Hallowell et al. | 194/344 |
| 8,701,860 B1 | 4/2014 | Blake et al. | 194/350 |
| 8,950,566 B2 | 2/2015 | Hallowell et al. | 194/206 |
| 8,959,029 B2 | 2/2015 | Jones et al. | 705/18 |
| 9,092,924 B1 | 7/2015 | Rasmussen et al. | 453/3 |
| 9,330,515 B1 | 5/2016 | Rasmussen et al. | 453/3 |
| 9,378,604 B1 * | 6/2016 | Rathjen | G07D 3/14 |
| 9,430,893 B1 | 8/2016 | Blake et al. | G07D 3/16 |
| 9,437,069 B1 | 9/2016 | Blake et al. | G07D 13/00 |
| 9,501,885 B1 | 11/2016 | Yacoubian et al. | G07D 3/14 |
| 9,508,208 B1 | 11/2016 | Jagielinski et al. | G07D 3/14 |
| 9,633,500 B1 | 4/2017 | Blake et al. | G07D 3/16 |
| 9,830,762 B1 | 11/2017 | Blake et al. | G07D 3/16 |
| 9,870,668 B1 | 1/2018 | Jagielinski et al. | G07D 5/08 |
| 9,875,593 B1 | 1/2018 | Adams et al. | G07D 3/06 |
| 2001/0034203 A1 | 10/2001 | Geib et al. | 453/3 |
| 2001/0048025 A1 | 12/2001 | Shinn | 235/382 |
| 2002/0065033 A1 | 5/2002 | Geib et al. | 453/3 |
| 2002/0069104 A1 | 6/2002 | Beach et al. | 705/14 |
| 2002/0074209 A1 | 6/2002 | Karlsson | 194/330 |
| 2002/0074210 A1 | 6/2002 | Brandle | 194/334 |
| 2002/0085745 A1 | 7/2002 | Jones et al. | 382/135 |
| 2002/0095587 A1 | 7/2002 | Doyle et al. | 713/186 |
| 2002/0107738 A1 | 8/2002 | Beach et al. | 705/14 |
| 2002/0126885 A1 | 9/2002 | Mennie et al. | 382/135 |
| 2002/0130011 A1 | 9/2002 | Casanova et al. | 194/344 |
| 2002/0147588 A1 | 10/2002 | Davis et al. | 704/246 |
| 2002/0151267 A1 | 10/2002 | Kuhlin et al. | 453/3 |
| 2002/0174348 A1 | 11/2002 | Ting | 713/186 |
| 2002/0179401 A1 | 12/2002 | Knox et al. | 194/217 |
| 2003/0004878 A1 | 1/2003 | Akutsu et al. | 705/43 |
| 2003/0013403 A1 | 1/2003 | Blake et al. | 453/60 |
| 2003/0042110 A1 | 3/2003 | Wilfong | 194/302 |
| 2003/0062243 A1 | 4/2003 | Mattice | 194/328 |
| 2003/0081824 A1 | 5/2003 | Mennie et al. | 382/135 |
| 2003/0127299 A1 | 7/2003 | Jones et al. | 194/217 |
| 2003/0168309 A1 | 9/2003 | Geib et al. | 194/302 |
| 2003/0168310 A1 | 9/2003 | Strauts et al. | 194/302 |
| 2003/0182217 A1 | 9/2003 | Chiles | 705/35 |
| 2003/0190882 A1 | 10/2003 | Blake et al. | 453/63 |
| 2003/0230464 A1 | 12/2003 | Deaville et al. | 194/302 |
| 2003/0234153 A1 | 12/2003 | Blake et al. | 194/347 |
| 2004/0021898 A1 | 2/2004 | Ashizaki | 358/1.15 |
| 2004/0055902 A1 | 3/2004 | Peklo | 206/0.815 |
| 2004/0092222 A1 | 5/2004 | Kowalczyk et al. | 453/12 |
| 2004/0153406 A1 | 8/2004 | Alarcon-Luther et al. | 705/41 |
| 2004/0153421 A1 | 8/2004 | Robinson | 705/75 |

(56) References Cited

U.S. PATENT DOCUMENTS

| | | | |
|---|---|---|---|
| 2004/0154899 A1 | 8/2004 | Peklo et al. | 193/33 |
| 2004/0173432 A1 | 9/2004 | Jones | 194/216 |
| 2004/0188221 A1 | 9/2004 | Carter | 194/215 |
| 2004/0195302 A1 | 10/2004 | Washington et al. | 232/15 |
| 2004/0199924 A1 | 10/2004 | Ganesh et al. | 719/313 |
| 2004/0200691 A1 | 10/2004 | Geib et al. | 194/302 |
| 2004/0238319 A1 | 12/2004 | Hand et al. | 194/207 |
| 2004/0238614 A1 | 12/2004 | Yoshioka et al. | 232/7 |
| 2004/0256197 A1 | 12/2004 | Blake et al. | 194/350 |
| 2005/0006197 A1 | 1/2005 | Wendell et al. | 194/302 |
| 2005/0035140 A1 | 2/2005 | Carter | 221/195 |
| 2005/0040007 A1 | 2/2005 | Geib et al. | 194/302 |
| 2005/0040225 A1 | 2/2005 | Csulits et al. | 235/379 |
| 2005/0045450 A1 | 3/2005 | Geib et al. | 194/318 |
| 2005/0067305 A1 | 3/2005 | Bochonok et al. | 206/8 |
| 2005/0077142 A1 | 4/2005 | Tam et al. | 194/217 |
| 2005/0086140 A1 | 4/2005 | Ireland et al. | 705/35 |
| 2005/0087425 A1 | 4/2005 | Peklo | 194/350 |
| 2005/0096986 A1 | 5/2005 | Taylor et al. | 705/16 |
| 2005/0098625 A1 | 5/2005 | Walker et al. | 235/381 |
| 2005/0108165 A1 | 5/2005 | Jones et al. | 705/43 |
| 2005/0109836 A1 | 5/2005 | Ben-Aissa | 235/381 |
| 2005/0121507 A1 | 6/2005 | Brown et al. | 235/379 |
| 2005/0124407 A1 | 6/2005 | Rowe | 463/25 |
| 2005/0150740 A1 | 7/2005 | Finkenzeller et al. | 194/207 |
| 2005/0156318 A1 | 7/2005 | Douglas | 257/761 |
| 2005/0205654 A1 | 9/2005 | Carter | 235/7 R |
| 2005/0205655 A1 | 9/2005 | Carter | 235/7 R |
| 2005/0228717 A1 | 10/2005 | Gusler et al. | 705/14 |
| 2005/0256792 A1 | 11/2005 | Shimizu et al. | 705/35 |
| 2006/0032726 A1 | 2/2006 | Vook | 194/328 |
| 2006/0037835 A1 | 2/2006 | Doran et al. | 194/302 |
| 2006/0054455 A1 | 3/2006 | Kuykendall et al. | 194/217 |
| 2006/0054457 A1 | 3/2006 | Long et al. | 194/347 |
| 2006/0060363 A2 | 3/2006 | Carter | 172/111 |
| 2006/0064379 A1 | 3/2006 | Doran et al. | 705/42 |
| 2006/0065717 A1 | 3/2006 | Hurwitz et al. | 235/381 |
| 2006/0069654 A1 | 3/2006 | Beach et al. | 705/65 |
| 2006/0146839 A1 | 7/2006 | Hurwitz et al. | 370/401 |
| 2006/0148394 A1 | 7/2006 | Blake et al. | 453/12 |
| 2006/0149415 A1 | 7/2006 | Richards | 700/236 |
| 2006/0151285 A1 | 7/2006 | String | 194/350 |
| 2006/0154589 A1 | 7/2006 | String | 453/11 |
| 2006/0163029 A1 | 7/2006 | Wollny | 194/328 |
| 2006/0175176 A1 | 8/2006 | Blake | 194/216 |
| 2006/0182330 A1 | 8/2006 | Chiles | 382/135 |
| 2006/0196754 A1 | 9/2006 | Bochonok et al. | 194/347 |
| 2006/0205481 A1 | 9/2006 | Dominelli | 463/25 |
| 2006/0207856 A1 | 9/2006 | Dean et al. | 194/302 |
| 2006/0219519 A1 | 10/2006 | Molbak et al. | 194/346 |
| 2006/0253332 A1 | 11/2006 | Dobbins | 705/21 |
| 2006/0283685 A1 | 12/2006 | Cousin | 194/217 |
| 2007/0051582 A1 | 3/2007 | Bochonok et al. | 194/202 |
| 2007/0071302 A1 | 3/2007 | Jones et al. | 382/135 |
| 2007/0108015 A1 | 5/2007 | Bochonok et al. | 194/350 |
| 2007/0119681 A1 | 5/2007 | Blake et al. | 194/215 |
| 2007/0181676 A1 | 8/2007 | Mateen et al. | 235/381 |
| 2007/0187494 A1 | 8/2007 | Hanna | 235/383 |
| 2007/0221470 A1 | 9/2007 | Mennie et al. | 194/216 |
| 2007/0251800 A1 | 11/2007 | Castleberry | 194/219 |
| 2007/0269097 A1 | 11/2007 | Chiles et al. | 382/135 |
| 2007/0270997 A1 | 11/2007 | Brumfield et al. | 700/214 |
| 2008/0033829 A1 | 2/2008 | Mennie et al. | 705/16 |
| 2008/0044077 A1 | 2/2008 | Mennie et al. | 382/135 |
| 2008/0135608 A1 | 6/2008 | Ireland et al. | 232/1 D |
| 2008/0220707 A1 | 9/2008 | Jones et al. | 453/2 |
| 2008/0223930 A1 | 9/2008 | Rolland et al. | 235/385 |
| 2009/0018959 A1 | 1/2009 | Doran et al. | 705/44 |
| 2009/0048803 A1 | 2/2009 | Zweig | 702/172 |
| 2009/0236200 A1 | 9/2009 | Hallowell et al. | 194/215 |
| 2009/0236201 A1 | 9/2009 | Blake et al. | 194/215 |
| 2009/0239459 A1 | 9/2009 | Watts et al. | 453/18 |
| 2009/0242626 A1 | 10/2009 | Jones et al. | 235/379 |
| 2009/0320106 A1 | 12/2009 | Jones et al. | 726/5 |
| 2010/0038419 A1 | 2/2010 | Blake et al. | 235/379 |
| 2010/0065623 A1 | 3/2010 | Sauter | 232/1 D |
| 2010/0198726 A1 | 8/2010 | Doran et al. | 705/41 |
| 2010/0234985 A1 | 9/2010 | Shuren et al. | 700/223 |
| 2010/0261421 A1 | 10/2010 | Wendell et al. | 453/4 |
| 2010/0276485 A1 | 11/2010 | Jones et al. | 235/379 |
| 2010/0327005 A1 | 12/2010 | Martin et al. | 221/98 |
| 2011/0098845 A1 | 4/2011 | Mennie et al. | 700/223 |
| 2011/0099105 A1 | 4/2011 | Mennie et al. | 705/41 |
| 2011/0259961 A1 | 10/2011 | Fold et al. | 235/385 |
| 2011/0270695 A1 | 11/2011 | Jones et al. | 705/43 |
| 2012/0067950 A1 | 3/2012 | Blake | 235/381 |
| 2012/0156976 A1 | 6/2012 | Blake et al. | 453/4 |
| 2012/0301009 A1 | 11/2012 | Dabic | 382/136 |
| 2013/0178139 A1 | 7/2013 | Hallowell et al. | 453/15 |
| 2013/0199890 A1 | 8/2013 | Blake | 194/216 |
| 2013/0205723 A1 | 8/2013 | Blake et al. | 53/473 |
| 2014/0335770 A1 | 11/2014 | Martin | 453/3 |
| 2015/0302678 A1 | 10/2015 | Blake et al. | |
| 2016/0018873 A1 | 1/2016 | Fernald | 713/323 |

FOREIGN PATENT DOCUMENTS

| | | | | |
|---|---|---|---|---|
| CA | 2143943 C | 3/2003 | | G07D 3/16 |
| DE | 06 60 354 | 5/1938 | | G07F 17/26 |
| DE | 30 21 327 A1 | 12/1981 | | G07D 3/06 |
| EP | 0 351 217 A2 | 1/1990 | | G07F 9/04 |
| EP | 0 667 973 B1 | 1/1997 | | G07D 3/14 |
| EP | 0 926 634 A2 | 6/1999 | | G07D 3/14 |
| EP | 1 104 920 A1 | 6/2001 | | G07D 5/08 |
| EP | 1 209 639 A2 | 5/2002 | | G07F 19/00 |
| EP | 1 528 513 A1 | 5/2005 | | G07F 7/08 |
| FR | 2042254 | 2/1971 | | G07B 11/00 |
| GB | 2514241 | 11/1917 | | G07D 9/00 |
| GB | 2035642 A | 6/1980 | | G07F 7/10 |
| GB | 2175427 A | 11/1986 | | G07F 17/42 |
| GB | 2198274 A | 6/1988 | | G07D 3/00 |
| GB | 2458387 A | 9/2009 | | G07D 11/00 |
| GB | 2468783 A | 9/2010 | | G07D 9/00 |
| JP | 49-058899 | 6/1974 | | |
| JP | 52-014495 | 2/1977 | | G07F 5/10 |
| JP | 52-071300 A | 6/1977 | | G07F 5/22 |
| JP | 56-040992 A | 4/1981 | | G07F 5/18 |
| JP | 57-117080 A | 7/1982 | | G07D 3/16 |
| JP | 59-079392 A | 5/1984 | | G07D 3/16 |
| JP | 60-016271 U | 2/1985 | | G07F 7/02 |
| JP | 62-134168 U | 8/1987 | | G07B 1/00 |
| JP | 62-182995 A | 8/1987 | | G07F 7/08 |
| JP | 62-221773 A | 9/1987 | | G06F 15/30 |
| JP | 62-166562 U | 10/1987 | | G07B 1/00 |
| JP | 64-035683 A | 2/1989 | | G07D 9/00 |
| JP | 64-042789 A | 2/1989 | | G07F 9/00 |
| JP | 64-067698 A | 3/1989 | | G07F 7/08 |
| JP | 01-118995 A | 5/1989 | | G07G 1/00 |
| JP | 01-307891 A | 12/1989 | | G07D 9/00 |
| JP | 02-050793 A | 2/1990 | | G07D 9/00 |
| JP | 02-252096 A | 10/1990 | | G07D 9/00 |
| JP | 03-012776 A | 1/1991 | | G06F 15/30 |
| JP | 03-063795 A | 3/1991 | | G07D 3/00 |
| JP | 03-092994 A | 4/1991 | | G07D 9/00 |
| JP | 03-156673 A | 7/1991 | | G06F 15/30 |
| JP | 04-085695 A | 3/1992 | | G07F 11/72 |
| JP | 04-175993 A | 6/1992 | | G07F 5/22 |
| JP | 05-046839 A | 2/1993 | | G07D 5/02 |
| JP | 05-217048 A | 8/1993 | | G07D 3/16 |
| JP | 05-274527 A | 10/1993 | | G07D 9/00 |
| JP | 06-035946 A | 2/1994 | | G06F 15/30 |
| JP | 06-103285 A | 4/1994 | | G06F 15/21 |
| JP | 09-44641 A | 2/1997 | | G06T 1/00 |
| JP | 09-251566 A | 9/1997 | | G07F 7/08 |
| JP | 2002-117439 A | 4/2002 | | G07D 9/00 |
| JP | 2003-242287 A | 8/2003 | | G06F 17/60 |
| JP | 2004-213188 A | 7/2004 | | G06F 17/60 |
| SE | 44 244 | 9/1988 | | |
| WO | WO 85/00909 A1 | 2/1985 | | G07D 5/02 |
| WO | WO 91/06927 A1 | 5/1991 | | G07D 3/16 |
| WO | WO 91/08952 A1 | 6/1991 | | B65B 11/04 |
| WO | WO 91/12594 A1 | 8/1991 | | G07D 3/16 |
| WO | WO 91/18371 A1 | 11/1991 | | G07D 3/16 |
| WO | WO 92/08212 A1 | 5/1992 | | G07D 3/16 |

(56) References Cited

FOREIGN PATENT DOCUMENTS

| | | | |
|---|---|---|---|
| WO | WO 92/20043 A1 | 11/1992 | ............... G07D 3/00 |
| WO | WO 92/20044 A1 | 11/1992 | ............... G07D 3/16 |
| WO | WO 92/22044 A1 | 12/1992 | ............... G07D 3/00 |
| WO | WO 93/00660 A1 | 1/1993 | ............... G07D 3/00 |
| WO | WO 93/09621 A1 | 5/1993 | ............... H04L 9/32 |
| WO | WO 94/06101 A1 | 3/1994 | ............... G07D 3/16 |
| WO | WO 94/08319 A1 | 4/1994 | ............... G07D 3/16 |
| WO | WO 94/23397 A1 | 10/1994 | ............... G07D 3/00 |
| WO | WO 95/02226 A1 | 1/1995 | ............... G07D 3/00 |
| WO | WO 95/04978 A1 | 2/1995 | ............... G07D 3/06 |
| WO | WO 95/06920 A1 | 3/1995 | ............... G07D 3/16 |
| WO | WO 95/09406 A1 | 4/1995 | ............... G07D 3/16 |
| WO | WO 95/13596 A1 | 5/1995 | ............... G07D 3/14 |
| WO | WO 95/19017 A1 | 7/1995 | ............... G07D 1/00 |
| WO | WO 95/23387 A1 | 8/1995 | ............... G07D 3/16 |
| WO | WO 95/30215 A1 | 11/1995 | ............. G07F 17/42 |
| WO | WO 96/07163 A1 | 3/1996 | ............... G07D 3/06 |
| WO | WO 96/07990 A1 | 3/1996 | ............... G07D 3/16 |
| WO | WO 96/12253 A1 | 4/1996 | ............... G07D 3/00 |
| WO | WO 96/27525 A1 | 9/1996 | ............. B65B 11/02 |
| WO | WO 96/27859 A1 | 9/1996 | ............... G07D 5/08 |
| WO | WO 97/22919 A1 | 6/1997 | ............... G06F 7/08 |
| WO | WO 97/25692 A1 | 7/1997 | ............... G07D 3/06 |
| WO | WO 98/24041 A1 | 6/1998 | ............. G06F 17/60 |
| WO | WO 98/24067 A1 | 6/1998 | ............... G07D 3/14 |
| WO | WO 98/48383 A2 | 10/1998 | ............... G07D 1/00 |
| WO | WO 98/48384 A2 | 10/1998 | ............... G07D 1/00 |
| WO | WO 98/48385 A2 | 10/1998 | ............... G07D 1/00 |
| WO | WO 98/51082 A1 | 11/1998 | ............... H04N 7/18 |
| WO | WO 98/59323 A1 | 12/1998 | ............... G07D 3/00 |
| WO | WO 99/00776 A1 | 1/1999 | ............... G07F 9/06 |
| WO | WO 99/06937 A1 | 2/1999 | ............. G06F 19/00 |
| WO | WO 99/16027 A2 | 4/1999 | ............... G07F 7/02 |
| WO | WO 99/33030 A1 | 7/1999 | ............... G07D 3/00 |
| WO | WO 99/41695 A1 | 8/1999 | ............... G06K 5/00 |
| WO | WO 99/48057 A1 | 9/1999 | ............... G07D 3/06 |
| WO | WO 99/48058 A1 | 9/1999 | ............... G07D 3/06 |
| WO | WO 00/48911 A1 | 8/2000 | ............. B65B 67/12 |
| WO | WO 00/65546 A1 | 11/2000 | ............... G07F 1/04 |
| WO | WO 01/63565 A2 | 8/2001 | ............... G07D 9/00 |
| WO | WO 02/071343 A1 | 9/2002 | ............... G07D 3/00 |
| WO | WO 03/052700 A2 | 6/2003 | |
| WO | WO 03/079300 A1 | 9/2003 | ............... G07D 7/00 |
| WO | WO 03/085610 A1 | 10/2003 | ............... G07D 9/06 |
| WO | WO 03/107280 A2 | 12/2003 | |
| WO | WO 04/044853 A1 | 5/2004 | ............... G07D 3/12 |
| WO | WO 04/109464 A2 | 12/2004 | |
| WO | WO 05/041134 A2 | 5/2005 | |
| WO | WO 05/088563 A1 | 9/2005 | ............... G07D 3/00 |
| WO | WO 06/086531 A1 | 8/2006 | ............... G07D 9/00 |
| WO | WO 07/035420 A2 | 3/2007 | ............... G06F 7/00 |
| WO | WO 07/120825 A2 | 10/2007 | ............... G06K 9/00 |

OTHER PUBLICATIONS

U.S. Appl. No. 15/356,295, Office Action, dated Jul. 10, 2017; (13 pages).
U.S. Appl. No. 14/794,262, Office Action, dated Mar. 16, 2016; (9 pages).
U.S. Appl. No. 14/936,846, Office Action, dated Nov. 17, 2016; (12 pages).
U.S. Appl. No. 15/492,561, Office Action, dated Dec. 1, 2017; (8 pages).
U.S. Appl. No. 15/360,004, Office Action, dated Jul. 10, 2017 (9 pages.
U.S. Appl. No. 15/360,004, Notice of Allowance, dated Dec. 7, 2017 (9 pages).
Amiel Industries: AI-1500 'Pulsar' High Performance Sorting and Bagging Machine, 13 pages (date unknown, but prior to Dec. 14, 2000).
AUI: Coinverter—"No More Lines . . . Self-Serve Cash-Out," by Cassius Elston, 1995 World Games Congress/Exposition Converter, 1 page (dated prior to 1995).
Brandt: 95 Series Coin Sorter Counter, 2 pages (1982).
Brandt: Model 817 Automated Coin and Currency Ordering System, 2 pages (1983).
Brandt: Model 920/925 Counter, 2 pages (date unknown, prior to Jul. 2011, possibly prior to Mar. 17, 1997).
Brandt: System 930 Electric Counter/Sorter, "Solving Problems, Pleasing Customer, Building Deposits," 1 page (date unknown, prior to Mar. 2, 2011, possibly prior to Mar. 17, 1997).
Brandt: Model 940-6 High Speed Sorter/Counter, 2 pages (date unknown, prior to Oct. 31, 1989).
Brandt: System 945 High-Speed Sorter, 2 pages (date unknown, prior to Mar. 2, 2011, possibly prior to Mar. 17, 1997).
Brandt: Model 952 Coin Sorter/Counter, 2 pages (date unknown, prior to Oct. 31, 1989).
Brandt: Model 954 Coin Sorter/Counter, 2 pages (date unknown, prior to Oct. 31, 1989).
Brandt: Model 957 Coin Sorter/Counter, 2 pages (date unknown, prior to Oct. 31, 1989).
Brandt: Model 958 Coin Sorter/Counter, 5 pages ( © 1982).
Brandt: Model 960 High-Speed Coin Sorter & Counter, 2 pages (1984).
Brandt; Model 966 Microsort™ Coin Sorter and Counter, 4 pages, (1979).
Brandt: Model 970 Coin Sorter and Counter, 2 pages (1983).
Brandt: Model 1205 Coin Sorter Counter, 2 pages (1986).
Brandt: Model 1400 Coin Sorter Counter, 2 pages (date unknown, prior to Mar. 2, 2011, possibly prior to Mar. 17, 1997).
Brandt: Model 8904 Upfeed—"High Speed 4-Denomination Currency Dispenser," 2 pages (1989).
Brandt: Mach 7 High-Speed Coin Sorter/Counter, 2 pages (1992).
Case ICC Limited: CDS Automated Receipt Giving Cash Deposit System, 3 pages (date unknown, prior to Nov. 15, 2000).
Cash, Martin: Newspaper Article "Bank Blends New Technology With Service," Winnipeg Free Press, 1 page (Sep. 4, 1992).
Childers Corporation: Computerized Sorter/Counter, "To coin an old adage, time is money. . .," 3 pages (1981).
CTcoin: CDS602 Cash Deposit System, 1 page (date unknown, prior to Jan. 15, 2001).
Cummins: Cash Information and Settlement Systems (Form 023-1408), 4 pages (date Dec. 1991).
Cummins: The Universal Solution to All Coin and Currency Processing Needs (Form 13C1218 3-83), 1 page (Mar. 1983).
Cummins: JetSort® High Speed Sorter/Counter Kits I & J—Operating Instructions (Form 022-7123-00) 12 pages (1994).
Cummins: JetSort® Coin Sorter Counter/CA-130XL Coin Wrapper, Cummins Automated Money Systems (AMS) Case Study—Fifth-Third, "6,000 Coin Per Minute Counter/Sorter Keeps pace With Fifth-Third Bank's Money Processing Needs," (Form 13C1180), 2 pagers (Nov. 1981).
Cummins: JetSort®, "Venders Love JetSort," (13C1255), 1 page (Mar. 1987).
Cummins: JetSort® "High Speed Coin Sorter & Counter for Payphone Applications," "CTOCS Ready" (Form 023-1365), 2 pages (Mar. 1989).
Cummins: JetSort® mailer, "One moving part simplicity," "Vendors—Are validators changing your coin anbd currency needs?" (Form 023-1297), 3 pages (Apr. 1987).
Cummins: JetSort® Series V High Speed Coin Sorter/Counter, (Form 023-1383), 2 pages (Sep. 1990).
Cummins: JetSort® "Time for a Change, Be a smashing success!," (Form 023-1328), 1 page (Jun. 1988).
Cummins: JetSort® "Time for a Change—JetSort® vs. Brandt X," (Form 023-1330), 1 page (Jun. 1988).
Cummins: JetSort® "Time for a Change—No Coins Sorted After 3:00 or on Saturday," (Form 023-1327), 1 page (Aug. 1988).
Cummins: JetSort®, "What do all these Banks have in Common . . . ?", JetSort, CA-130XL coin wrapper, CA-118 coin wrapper, CA-4000 JetCount, (13C1203), 3 pages (Aug. 1982).
Cummins: JetSort® 700-01/CA-118 Coin Wrapper, Cummins Automated Money Systems (AMS) Case Study—University State Bank, "Cummins Money Processing System Boosts Teller Service at University State Bank," (Form 13C1192), 2 pages (Mar. 1982).

(56) References Cited

OTHER PUBLICATIONS

Cummins: JetSort® 700-01, Cummins Automated Money Systems (AMS) Case Study—First State Bank of Oregon, "JetSort® Gives Bank Coin Edge," (Form 13C1196), 2 pages (Apr. 1982).
Cummins: JetSort® 700-01 Coin Sorter/Counter, Operating Instructions, 14 pages (1982).
Cummins: JetSort® 701, Cummins Automated Money Systems (AMS) Case Study—Convenco Vending, "High Speed Coin Sorter increases coinprocessing power at Convenco Vending," (Form 13C1226), 2 pages (Jul. 1983).
Cummins: JetSort Models 701 and 750 , "State-of-the-art coin processing comes of age," 2 pages (Feb. 1984).
Cummins: JetSort® Model CA-750 Coin Processor (Item No. 50-152), 1 page (Jul. 1984).
Cummins: JetSort® Model CA-750 Coin Sorter/Counter and CA-4050 JetCount currency counter, "Money Processing Made Easy," (Form 13C1221) 2 pages (Jun. 1983)
Cummins: JetSort® Model 1701 with JetStops, Operating Instructions Manual (Form 022-1329-00), 16 pages (1984).
Cummins: JetSort® Model 1760 brochure, (Form 023-1262-00), 2 pages (Jul. 1985).
Cummins: JetSort® Models 1770 and 3000, Communication Package specification and operating instructions, 10 pages (uncertain, possibly Nov. 1985).
Cummins: JetSort® Model 1770, "JetSort® Speed and Accuracy, Now with Communications!", (Form 023-1272) 1 page (Oct. 1986).
Cummins: JetSort® 2000 Series High Speed Coin Sorter/Counter (Form 023-1488), 2 pages (Oct. 2000).
Cummins: JetSort® 3000 Series High Speed Coin Sorter (Form 023-1468 Rev 1), 2 pages (Feb. 1995).
Cummins: JetSort® 3000 Series Options, "Talking JetSort 3000," (Form 023-1338-00), 1 page (between Jan. 1989-Feb. 1989).
Cummins: JetSort® "3000 Coins per Minute!," (Form 023-1312), 1 page (date unknown, est. 1987).
Cummins: JetSort® 3200, Enhanced electronics for the JetSort® 3200 (Form 023-1350), 1 page (Arp. 1987).
De La Rue: CDS 500 Cash Deponier System, 6 pages (date unknown, p. 5 has date May 94, p. 6 has date Dec. 1992) (German).
De La Rue: CDS 5700 and CDS 5800 Cash Deponier System (German) and translation, 7 pages (date unknown, prior to Aug. 13, 1996).
Diebold: Merchant MicroBranch, "Merchant MicroBranch Combines ATM After-Hour Depository Rolled-Coin Dispenser," Bank Technology News, 1 page (Nov. 1997).
Fa. GBS—Geldbearbeitungssysteme: GBS9401SB Technical Specification, 24 pages (date unknown, prior to Nov. 10, 2010).
Frisco Bay: Commercial Kiosk, "Provide self-service solutions for your business customers," 4 pages (date unknown, prior to Mar. 2, 2011, p. 4 has date 1996).
Glory: AMT Automated Merchant Teller, 4 pages (date unknown, prior to Jan. 15, 2001).
Glory: CRS-8000 Cash Redemption System, 2 pages (1996).
Hamilton: Hamilton's Express Banking Center, In Less Space Than a Branch Manager's Desk, 4 pages (date unknown, prior to Jan. 15, 2001).
Intellectual Australia Pty. Ltd.: Microbank, "From down under: Microbank," "hand-held smart card terminal that combines smart card functions and telephone banking," 2 pages (Feb. 1996).
ISH Electronic: ISH I2005/500 Coin Counter (with translation), 4 pages (date unknown, prior to Aug. 1996).
ISH Electronic: ISH I2005/501 Self-Service Unit (with translation), 4 pages (date unknown, prior to Aug. 1996).
Namsys, Inc.: Namsys Express, Making currency management . . . more profitable, 2 pages (date unknown, prior to Jan. 15, 2001).
NGZ Geldzahlmaschinengesellschaft: NGZ 2100 Automated Coin Depository, 4 pages (date unknown, prior to Sep. 1996).
Perconta: Contomat Coin Settlement Machine for Customer Self Service, 2 pages (date unknown, prior to Apr. 2003).
Prema GmbH: Prema 405 (RE) Self Service Coin Deposit Facility, 2 pages (date unknown, prior to Apr. 2003).
Reis Eurosystems: CRS 6501/CRS 6510 Cash Receipt Systems for Self-Service Area, 3 pages (date unknown, prior to Aug. 13, 1996, maybe Feb. 1995).
Reis Eurosystems: CRS 6520/ CRS 6525 prior to Apr. 2003) Standard-Class Coin Deposit Systems, 1 page (date unknown, prior to Apr. 2003).
Reis Eurosystems: CS 3510 Disc-Sorter, 1 page (date unknown, prior to Apr. 2003).
Royal Bank: HEMEON, Jade, "Royal's Burlington drive-in bank provides customers 24-hour tellers," The Toronto Star, 1 page (Aug. 21, 1991).
Royal Bank: LEITCH, Carolyn, "High-Tech Bank Counts Coins," The Globe and Mail, 2 pages (Sep. 19, 1991).
Royal Bank: OXBY, Murray, "Royal Bank Opens 'Super Branch,'" The Gazette Montreal, 2 pages (Sep. 14, 1991).
Royal Bank: SuperBranch, "Experience the Ultimate in Convenience Banking," 2 pages (Feb. 1992).
Scan Coin: International Report, 49 pages (Apr. 1987).
Scan Coin: Money Processing Systems, 8 pages (date unknown, prior to Apr. 2003).
Scan Coin: World, 2 pages (Feb. 1988).
Scan Coin: CDS Cash Deposit System, 6 pages (date unknown, prior to Apr. 2003) [SC 0369].
Scan Coin: CDS Coin Deposit System—Technical Referens Manual, 47 pages (1989).
Scan Coin: CDS 600 User's Manual, 14 pages (date unknown, prior to Apr. 2003).
Scan Coin: CDS 600 & CDS 640 Cash Deposit System—Technical Manual, 45 pages (date unknown, prior to Apr. 2003).
Scan Coin: CDS MK 1 Coin Deposit System—Technical Manual, 32 pages (1991).
Scan Coin: SC 102 Value Counter Technical Manual, 28 pages (date unknown, prior to Apr. 2003).
Pay by Touch: Secure ID News, "Piggly Wiggly Extends Biometric Payments Throughout the Southeast U.S.," 2 pages, (Dec. 14, 2005).
ESD, Inc: Smartrac Card System, "Coinless laundry makes quarters obsolete; Smartrac Card System really makes a change in laundry industry," Business Wire, 2 pages (Feb. 23, 1996).
Meece, Mickey: Article "Development Bank of Singapore Gets Cobranding Edge with Smart Cards," American Banker, New York, NY, vol. 159, Iss. 195, p. 37, 2 pages (Oct. 10, 1994).
Scan Coin: Coin Sachet System brochure, 4 pages (last page marked "© Scan Coin / Jun. 2007").

\* cited by examiner

SYSTEMS, METHODS AND DEVICES FOR PROCESSING COINS WITH LINEAR ARRAY OF COIN IMAGING SENSORS

CROSS REFERENCE TO RELATED APPLICATIONS

This application is a continuation of U.S. patent application Ser. No. 15/360,004, filed on Nov. 23, 2016, now allowed, which is a continuation of U.S. patent application Ser. No. 14/804,670, filed on Jul. 21, 2015, now U.S. Pat. No. 9,508,208, which claims the benefit of priority to U.S. Provisional Patent Application No. 62/029,195, which was filed on Jul. 25, 2014, each of which is incorporated herein by reference in its entirety.

TECHNICAL FIELD

The present disclosure relates generally to systems, methods, and devices for processing currency. More particularly, aspects of this disclosure relate to coin processing units for imaging and evaluating batches of coins.

BACKGROUND

Some businesses, particularly banks, are regularly faced with large amounts of currency which must be organized, counted, authenticated and recorded. To hand count and record large amounts of currency of mixed denominations requires diligent care and effort, and demands significant manpower and time that might otherwise be available for more profitable and less tedious activity. To make counting of bills and coins less laborious, machines have been developed which automatically sort, by denomination, mixed assortments of currency, and transfer the processed currency into receptacles specific to the corresponding denominations. For example, coin processing machines for processing large quantities of coins from either the public at large or private institutions, such as banks, casinos, supermarkets, and cash-in-transit (CIT) companies, have the ability to receive bulk coins from users of the machine, count and sort the coins, and store the received coins in one or more coin receptacles, such as coin bins or coin bags. One type of currency processing machine is a redemption-type processing machine wherein, after the deposited coins and/or bank notes are counted, funds are returned to the user in a pre-selected manner, such as a payment ticket or voucher, a smartcard, a cash card, a gift card, and the like. Another variation is the deposit-type processing machine where funds which have been deposited by the user are credited to a personal account. Hybrid variations of these machines are also known and available.

A well-known device for processing coins is the disk-type coin sorter. In one exemplary configuration, the coin sorter, which is designed to process a batch of mixed coins by denomination, includes a rotatable disk that is driven by an electric motor. The lower surface of a stationary, annular sorting head is parallel to and spaced slightly from the upper surface of the rotatable disk. The mixed batch of coins is progressively deposited onto the top surface of the rotatable disk. As the disk is rotated, coins deposited on the top surface thereof tend to slide outwardly due to centrifugal force. As the coins move outwardly, those coins which are lying flat on the top surface of the rotatable disk enter a gap between the disk and the sorting head. The lower surface of the sorting head is formed with an array of exit channels which guide coins of different denominations to different exit locations around the periphery of the disk. The exiting coins, having been sorted by denomination for separate storage, are counted by sensors packed along the exit channel. A representative disk-type coin sorting mechanism is disclosed in U.S. Pat. No. 5,009,627, to James M. Rasmussen, which is incorporated herein by reference in its entirety and for all purposes.

It is oftentimes desirable in the sorting of coins to discriminate between valid coins and invalid coins. Use of the term "valid coin" can refer to genuine coins of the type to be sorted. Conversely, use of the term "invalid coin" can refer to items in the coin processing unit that are not one of the coins to be sorted. For example, it is common that foreign (or "stranger") coins and counterfeit coins enter a coin processing system for sorting domestic coin currency. So that such items are not sorted and counted as valid coins, it is helpful to detect and discard these "invalid coins" from the coin processing system. In another application wherein it is desired to process only U.S. quarters, nickels and dimes, all other U.S. coins, including dollar coins, half-dollar coins, pennies, etc., are considered "invalid." Additionally, coins from all other coins sets including Canadian coins and European coins, for example, would be considered "invalid" when processing U.S. coins. In another application it may be desirable to separate coins of one country (e.g., Canadian coins) from coins of another country (e.g., U.S. coins). Finally, any truly counterfeit coins (also referred to in the art as "slugs") are always considered "invalid" regardless of application.

Historically, coins have been sorted and validated or otherwise processed based on physical assessment of their structural characteristics, such as coin diameter, coin thickness, shape, and engravings on obverse and reverse sides of the coin. To improve discriminating accuracy, coin processing units have been designed for discriminating and authenticating coins by optically detecting coin surface patterns. For example, one conventional coin discriminating apparatus is provided with light generating elements, such as light emitting diodes (LED's), for projecting light onto a passing coin, and a photodetector, charge-coupled device (CCD) detector, or other optical sensor for optically detecting light emitted from the light emitting elements and reflected by the surface of the coin. From the reflected light pattern, the apparatus is able to authenticate and denominate coins based on coin image pattern data that was optically detected and digitized.

SUMMARY

One drawback with many prior art optical coin discriminating devices is an undesirably large proportion of discrimination errors caused by variations in coin surface reflectance due to aging and wear. Another drawback with prior art discrimination and authentication methods is the use of single point sensors, each of which is employed to detect a single coin parameter. With this approach, it is particularly difficult to detect, for example, all of the defects in a coin unless every defect passes directly under the sole sensor. Use of a single, wider sensor to detect information from the entire coin typically lacks spatial resolution. In addition, the processing and remediation time for identifying and removing invalid or unfit coins using many conventional optical coin discriminating devices is undesirably long for bulk coin processing systems that must process thousands of coins within a few minutes. In addition to being slow and unreliable, many conventional optical coin discriminating devices are costly and require a great deal of packaging space with a large window for imaging. Moreover, most optical coin processing systems that are available today utilize single wavelength lighting schemes that can only capture limited spectral characteristics of the coins being processed.

Currency processing systems, coin processing machines, coin processing units, and methods of imaging and processing batches of coins are presented herein. Some aspects of the present disclosure are directed to currency processing systems, such as coin processing machines with disk-type coin processing units, which utilize a one-dimensional (1D) or linear array of coin-imaging sensors. For some implementations, multiple linear arrays are aligned one next to the other or staggered. Traditionally, the term imaging has been associated with optical imaging provided by optical sensors. However, as used herein, the term "imaging" also includes images generated by non-optical sensing elements which allow mapping of the specific properties of an object. Typically the quality of the optical image has been associated with the size of the smallest segment of the image, known as a "pixel." The traditional definition of the optical pixel, however, can be extended to other techniques of imaging, such as magnetic, capacitive, electromagnetic and other. This disclosure will teach about using a 1D linear array of sensors to map/image certain properties of objects, such as coins and banknotes.

For some embodiments, the linear array consists of optical sensors, electromagnetic sensors, magnetic field or remanence sensors, or capacitive sensors. In this regard, an optical sensor array will produce an optical image, a magnetic sensor array will produce a magnetic image, a capacitive sensor array will produce a capacitive image, and an electromagnetic sensor array will produce an electromagnetic image, and so on. Each sensor system may consist essentially of means to excite a specific property of the coin, means to detect such a property using a 1D array of sensors capable of detecting such a property, means to process the sensors' signals, means to convert the signals into a digital format, means to analyze the information contained in the signal against a specific pattern or detection or authentication algorithm, and means to provide information about, for example, coin denomination, authentication, fitness and other relevant information.

In an example, an imaging-capable coin processing machine may include a coin transport system, a coin imaging sensor system, an electronics and image processing system, and a processing system to decide if each processed coin is fit for circulation, is of a particular denomination, belongs to a specific coin set, is authentic, and/or meets other criteria as required by the system. For some embodiments, the coin transport system can transport coins at a linear speed of at least approximately 50 inches per second (ips) and, for some embodiments, at a linear speed of at least approximately 300 ips. It is also within the scope and spirit of this disclosure to process coins at speeds which exceed 300 ips and at speeds that are slower than 50 ips. The 1D sensor array may include means to excite a certain property or properties of a coin using, for example, electric energy, magnetic energy, or electromagnetic energy, and means to capture the response from the coin by capturing imaging information by means of using the plurality of sensing elements. The resolution of the image may range from at least approximately 2 dots per inch (dpi) and, for some embodiments, at least approximately 50 dpi or more.

Aspects of the present disclosure are directed to a currency processing system with a housing, one or more coin receptacles, and a disk-type coin processing unit. The housing has a coin input area for receiving a batch of coins. The one or more coin receptacles are stowed inside or adjacent the housing and are otherwise operatively coupled to the housing. The disk-type coin processing unit is operatively coupled to the coin input area and the one or more coin receptacles to transfer coins therebetween. The coin processing unit includes a rotatable disk for imparting motion to a plurality of the coins, and a sorting head with a lower surface that is generally parallel to and at least partially spaced from the rotatable disk. The lower surface forms a plurality of shaped regions for guiding the coins, under the motion imparted by the rotatable disk, to a plurality of exit stations through which the coins are discharged from the coin processing unit to the one or more coin receptacles. A linear array of sensors is mounted to the sorting head adjacent the rotatable disk. The linear array of sensors is configured to sense each of the coins on the rotatable disk and output a signal indicative of coin image information for processing each coin. In the present disclosure, a disk-type coin processing unit is provided as a specific example for implementation of the novel and inventive concepts of the subject invention; however the invention is applicable to any type of coin processing unit where the position of a processed coin is controlled.

A coin processing machine is also featured in accordance with aspects of this disclosure. The coin processing machine has a housing with a coin input area for receiving therethrough a batch of coins. Plural coin receptacles are stowed inside the housing. A processor is also stored inside the housing or, optionally, stored remotely and communicatively coupled to the coin processing machine. A disk-type coin processing unit is disposed at least partially inside the housing and is operatively coupled to the coin input area and the plurality of coin receptacles to transfer coins therebetween. The coin processing unit includes a rotatable disk for supporting on an upper surface thereof and imparting motion to a plurality of coins received from the coin input area. The coin processing unit also includes a stationary sorting head with a lower surface that is generally parallel to and spaced slightly apart from the rotatable disk. The lower surface forms a plurality of exit channels for guiding the coins, under the motion imparted by the rotatable disk, to exit stations through which the coins are discharged to one or more of the coin receptacles. A linear array of sensors is mounted to the sorting head facing the rotatable disk. Optionally, the linear array of sensors is mounted to the housing to allow capturing of imaging information from the opposite side of the coin. The linear array of sensors is configured to examine the entirety of an upper surface of each of the coins on the rotatable disk and output to the processor a coin image signal indicative thereof. The processor is configured to receive the coin image signals from the linear array of sensors and generate therefrom an image of the upper surface of each of the coins for processing the coins. Optionally, the linear array of sensors is configured to "face" a surface of each of the coins, which may include an upper surface, a lower surface, or both, and examine the entirety of the coin and output to the processor a coin image signal indicative thereof. In some embodiments, the imaging sensor images the side of the coin.

According to other aspects of the present disclosure, a coin imaging sensor system for a coin processing apparatus is presented. The coin processing apparatus includes a housing with an input area for receiving coins, one or more coin receptacles for stowing processed coins, a coin sorting device for separating the coins by denomination, and a coin transport mechanism for transferring the coins from the input area, through the coin sorting device, to the one or more coin receptacles. The coin imaging sensor system comprises a linear array of sensors that is mounted inside the housing adjacent the coin transport mechanism downstream from the coin input area and upstream from the one or more coin receptacles. The linear array of sensors is configured to sense each of the coins and output a signal indicative of coin image information. An image processing circuit is operatively coupled to the linear array of sensors and configured to process the coin image information signals output therefrom. The coin imaging sensor system also includes a processor that is operatively coupled to the image processing circuit and configured to examine the processed signals and generate therefrom an image for each of the coins for processing the coins.

In accord with yet other aspects of the present disclosure, a currency processing device is presented. The currency processing device includes a coin input area for receiving coins from a user, and at least one coin receptacle for receiving and stowing processed coins. The currency processing device also includes a coin processing unit that receives coins from the coin input area, processes the received coins, and outputs the processed coins to the coin receptacle(s). A linear array of sensors is mounted to or adjacent the coin processing unit. The linear array of sensors is configured to examine, for example, one side (surface) or both sides (surfaces) or the side (thickness) of each of the processed coins and output a signal indicative of coin image information. At least one processor receives the coin image signals from the linear array of sensors and generates therefrom an image of a surface of each of the coins.

For any of the disclosed configurations, the linear array of sensors may comprise or consist essentially of electromagnetic imaging sensors, magnetic in-field or magnetic remanence imaging sensors, ultrasonic imaging sensors, time-decay fluorescence sensors, and/or capacitive imaging sensors. For some configurations, numerous identical sensors are aligned rectilinearly adjacent one another, extending transversely with respect to the path of transport of the coins. Optionally, a second linear array of sensors can be mounted generally parallel to and aligned with or interlaced with the linear array of sensors. Like the first array, the second linear array of sensors examines passing coins and generates signals indicative of coin image information for processing the coins. It may be desirable that each linear array of sensors be configured to examine substantially the entire area of a surface of each of the coins.

The above summary is not intended to represent each embodiment or every aspect of the present disclosure. Rather, the foregoing summary merely provides an exemplification of some of the novel aspects and features set forth herein. The above features and advantages, and other features and advantages of the present disclosure, will be readily apparent from the following detailed description of the exemplary embodiments and modes for carrying out the present invention when taken in connection with the accompanying drawings and appended claims.

Figure 1:
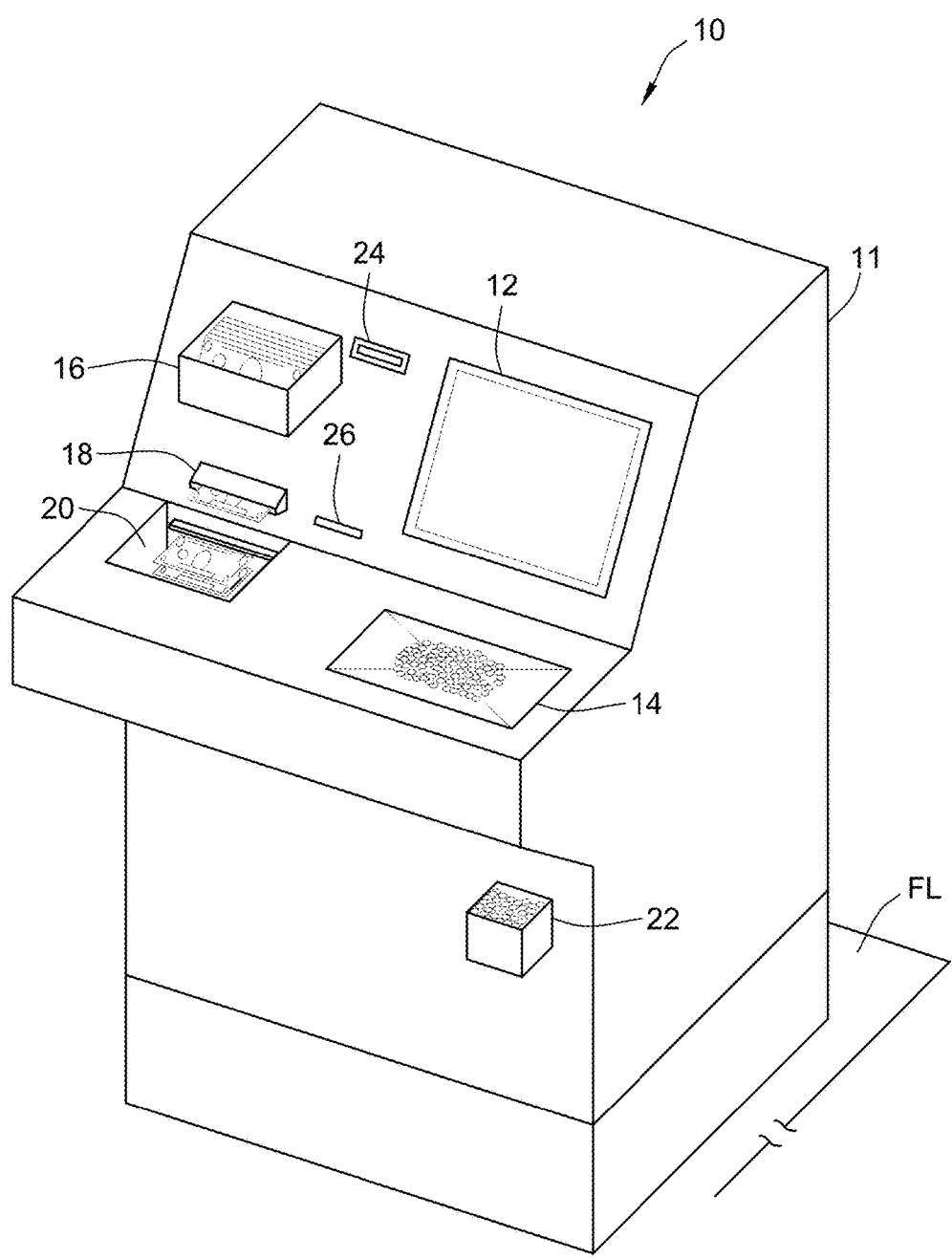
FIG. 1 is a front perspective-view illustration of an example of a currency processing system in accordance with aspects of the present disclosure.

The present disclosure is susceptible to various modifications and alternative forms, and some representative embodiments have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of the invention as defined by the appended claims.

DETAILED DESCRIPTION OF THE ILLUSTRATED EMBODIMENTS

This invention is susceptible of embodiment in many different forms. There are shown in the drawings, and will herein be described in detail, representative embodiments of the invention with the understanding that the present disclosure is to be considered as an exemplification of the principles of the invention and is not intended to limit the broad aspects of the invention to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference or otherwise. For purposes of the present detailed description, unless specifically disclaimed: the singular includes the plural and vice versa; the words "and" and "or" shall be both conjunctive and disjunctive; the word "all" means "any and all"; the word "any" means "any and all"; and the word "including" means "including without limitation." Moreover, words of approximation, such as "about," "almost," "substantially," "approximately," and the like, can be used herein in the sense of "at, near, or nearly at," or "within 3-5% of," or "within acceptable manufacturing tolerances," or any logical combination thereof, for example.

Referring now to the drawings, wherein like reference numerals refer to like components throughout the several views, FIG. 1 illustrates an example of a currency processing system, designated generally as 10, in accordance with aspects of the present disclosure. Many of the disclosed concepts are discussed with reference to the representative currency processing systems depicted in the drawings. However, the novel aspects and features of the present disclosure are not per se limited to the particular arrangements and components presented in the drawings. For example, many of the features and aspects presented herein can be applied to other currency processing systems without departing from the intended scope and spirit of the present disclosure. Examples of currency processing systems into which the disclosed concepts can be incorporated are the JetSort™ family of coin sorting machines available from Cummins-Allison Corp. The inventive aspects of the present disclosure, however, are not limited to coins processing systems utilizing sorting disks and could be utilized in other currency processing systems, such as conveyor belt systems and rail systems, regardless of the speed as long as the coin position is controlled. In addition, although differing in appearance, the coin processing systems and devices depicted and discussed herein can each take on any of the various forms, optional configurations, and functional alternatives described above and below with respect to the other disclosed embodiments, and thus can include any of the corresponding options and features. It should also be understood that the drawings are not necessarily to scale and are provided purely for descriptive purposes; thus, the individual and relative dimensions and orientations presented in the drawings are not to be considered limiting.

The currency processing system 10 is a hybrid redemption-type and deposit-type currency processing machine with which funds may be deposited into and returned from the machine, in similar or different forms, in whole or in part, and/or funds may be credited to and withdrawn from a personal account. The currency processing machine 10 illustrated in FIG. 1 includes a housing 11 that may house various input devices, output devices, and input/output devices. By way of non-limiting example, the currency processing machine 10 includes a display device 12 that may provide various input and output functions, such as displaying information and instructions to a user and receiving selections, requests, and other forms of inputs from a user. The display device 12 is, in various embodiments, a cathode ray tube (CRT), a high-resolution liquid crystal display (LCD), a plasma display, a light emitting diode (LED) display, a DLP projection display, an electroluminescent (EL) panel, or any other type of display suitable for use in the currency processing machine 10. A touch screen, which has one or more user-selectable soft touch keys, may be mounted over the display device 12. While a display device 12 with a touchscreen may be a preferred means for a user to enter data, the currency processing machine 10 may include other known input devices, such as a keyboard, mouse, joystick, microphone, etc.

The currency processing machine 10 includes a coin input area 14, such as a bin or tray, which receives batches of coins from a user. Each coin batch may be of a single denomination, a mixed denomination, a local currency, or a foreign currency, or any combination thereof. Additionally, a bank note input area 16, which may be in the nature of a retractable pocket or basket, is also offered by the currency processing machine 10. The bank note input area 16, which is illustrated in its open position in FIG. 1, can be retracted by the currency processing machine 10 once the bulk currency has been placed therein by the user. In addition to banknotes, or as a possible alternative, the bank note receptacle 16 of the currency processing machine 10 can also be operable to accommodate casino scrip, paper tokens, bar coded tickets, or other known forms of value. These input devices—i.e., the currency input areas 14 and 16, allow the user of the currency processing machine 10 to input his or her funds, which can ultimately be converted to some other sort of fund source that is available to the user. Optionally or alternatively, the currency processing machine 10 can operate to count, authenticate, valuate, and/or package funds deposited by a user.

In addition to the above-noted output devices, the currency processing machine 10 may include various output devices, such as a bank note dispensing receptacle 20 and a coin dispensing receptacle 22 for dispensing to the user a desired amount of funds in bank notes, coins, or a combination thereof. An optional bank note return slot 18 may also be included with the currency processing machine 10 to return notes to the user, such as those which are deemed to be counterfeit or otherwise cannot be authenticated or processed. Coins which cannot be authenticated or otherwise processed may be returned to the user via the coin dispensing receptacle 22. The currency processing machine 10 further includes a paper dispensing slot 26, which can be operable for providing a user with a receipt of the transaction that was performed.

In one representative transaction, the currency processing machine 10 receives funds from a user via the coin input area 14 and/or the bank note input area 16 and, after these deposited funds have been authenticated and counted, the currency processing machine 10 returns to the user an amount equal to the deposited funds but in a different variation of bank notes and coins. Optionally, the user may be assessed one or more fees for the transaction (e.g., service fees, transaction fees, etc.). For example, the user of the currency processing machine 10 may input $102.99 in various small bank notes and pennies and in turn receive a $100 bank note, two $1 bank notes, three quarters, two dimes, and four pennies. As another option or alternative, the currency processing machine 10 may simply output a voucher or a receipt of the transaction through the paper dispensing slot 26 which the user can then redeem for funds by an attendant of the currency processing machine 10. Yet another option or alternative would be for the currency processing machine 10 to credit some or all of the funds to a personal account, such as a bank account or store account. As yet another option, the currency processing machine 10 may credit some or all of the funds to a smartcard, gift card, cash card, virtual currency, etc.

The currency processing machine 10 may also include a media reader slot 24 into which the user inserts a portable medium or form of identification, such as a driver's license, credit card, or bank card, so that the currency processing machine 10 can, for example, identify the user and/or an account associated with the user. The media reader 24 may take on various forms, such as a ticket reader, card reader, bar code scanner, wireless transceiver (e.g., RFID, Bluetooth, etc.), or computer-readable-storage-medium interface. The display device 12 with a touchscreen typically provides the user with a menu of options which prompts the user to carry out a series of actions for identifying the user by displaying certain commands and requesting that the user press touch keys on the touch screen (e.g. a user PIN). The media reader device 24 of the illustrated example is configured to read from and write to one or more types of media.

This media may include various types of memory storage technology such as magnetic storage, solid state memory devices, and optical devices. It should be understood that numerous other peripheral devices and other elements exist and are readily utilizable in any number of combinations to create various forms of a currency processing machine in accord with the present concepts.

Figure 2:
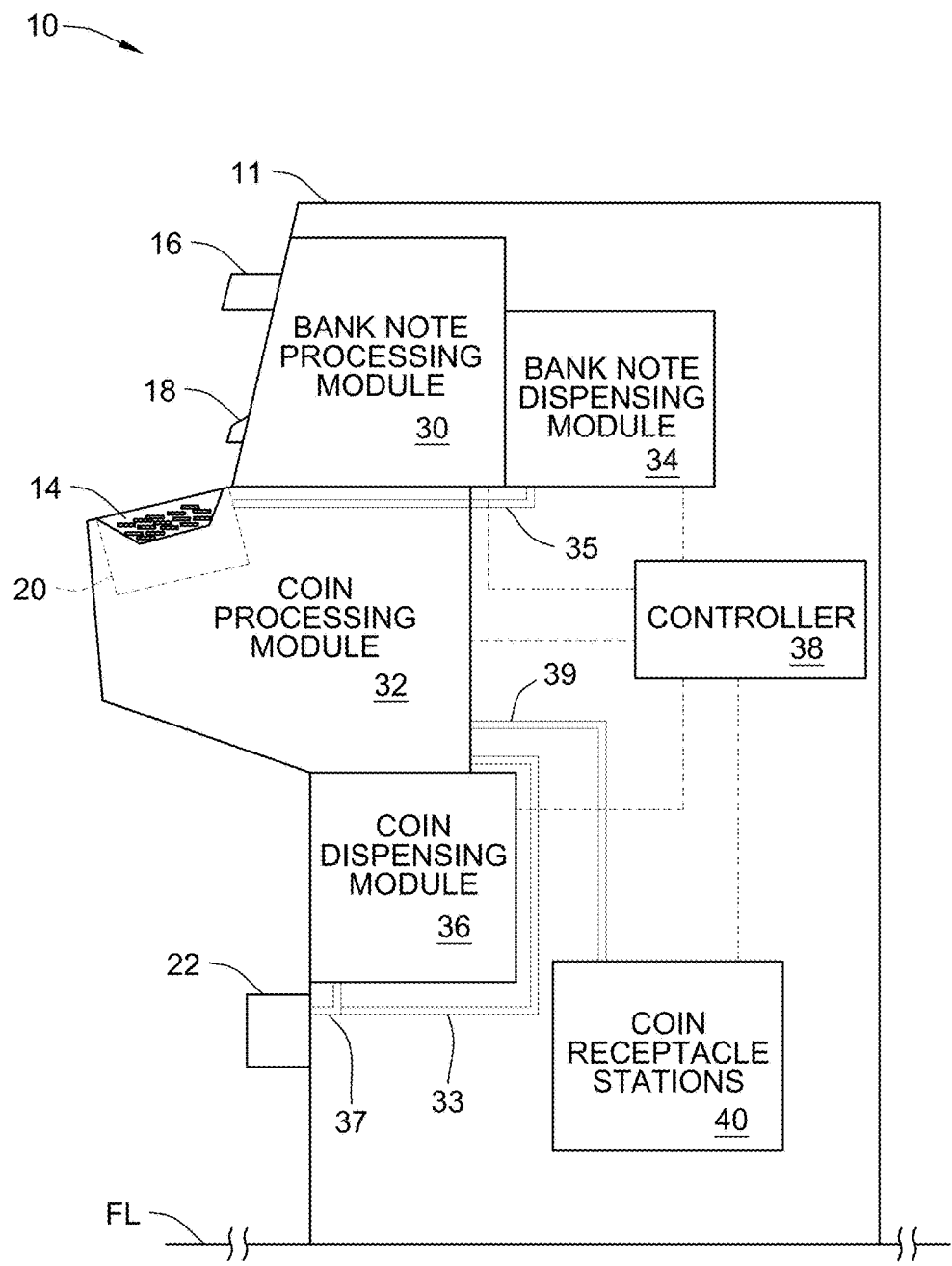
FIG. 2 is a schematic side-view illustration of the representative currency processing machine of FIG. 1.

FIG. 2 is a schematic illustration of the currency processing machine 10 showing various modules which may be provided in accord with the disclosed concepts. A bank note processing module 30, for example, receives bank notes from the bank note input area 16 for processing. In accord with a representative configuration, the inward movement of a retractable bank note input area 16 positions a stack of bills at a feed station of the bank note scanning and counting device which automatically feeds, counts, scans, authenticates, and/or sorts the bank notes, one at a time, at a high rate of speed (e.g., at least approximately 350 bills per minute). In place of, or in addition to the bank note input area 16, the currency processing machine 10 may include a single bank note receptacle for receiving and processing one bank note at a time. The bank notes that are recognized and/or deemed authentic by the bank note processing module 30 are delivered to a currency canister, cassette or other known storage container. When a bank note cannot be recognized by the bank note processing module 30, it can be returned to the customer through the bank note return slot 18. Exemplary machines which scan, sort, count, and authenticate bills as may be required by the bank note processing module 30 are described in U.S. Pat. Nos. 5,295,196, 5,970,497, 5,875,259, which are incorporated herein by reference in their respective entireties and for all purposes.

The representative currency processing machine 10 shown in FIG. 2 also includes a coin processing module 32. The coin processing module 32 may be operable to sort, count, valuate and/or authenticate coins which are deposited in the coin input receptacle 14, which is operatively connected to the coin processing module 32. The coins can be sorted by the coin processing module 32 in a variety of ways, but one known method is sorting based on the diameters of the coins. When a coin cannot be authenticated or counted by the coin processing module 32, it can be directed back to the user through a coin reject tube 33 which leads to the coin dispensing receptacle 22. Thus, a user who has entered such a non-authenticated coin can retrieve the coin by accessing the coin dispensing receptacle 22. Examples of coin sorting and authenticating devices which can perform the function of the coin processing module 32 are disclosed in U.S. Pat. Nos. 5,299,977, 5,453,047, 5,507,379, 5,542,880, 5,865, 673, 5,997,395, which are incorporated herein by reference in their respective entireties and for all purposes.

The currency processing machine 10 further includes a bank note dispensing module 34 which is connected via a transport mechanism 35 to the user-accessible bank note dispensing receptacle 20. The bank note dispensing module 34 typically dispenses loose bills in response to a request of the user for such bank notes. Also, the bank note dispensing module 34 may be configured to dispense strapped notes into the bank note dispensing receptacle 20 if that is desired. In one embodiment of the present disclosure, the user may select the denominations of the loose/strapped bills dispensed into the bank note dispensing receptacle 20.

The currency processing machine 10 also includes a coin dispensing module 36 which dispenses loose coins to the user via the coin dispensing receptacle 22. The coin dispensing module 36 is connected to the coin dispensing receptacle 22, for example, via a coin tube 37. With this configuration, a user of the currency processing machine 10 has the ability to select the desired coin denominations that he or she will receive during a transaction, for example, in response to user inputs received by one or more of the available input devices. Also, the coin dispensing module 36 may be configured to dispense packaged (e.g., sachet or rolled) coins into the coin dispensing receptacle 22 if that is desired. The coins which have been sorted into their respective denominations by the coin processing module 32 are discharged into one or more coin chutes or tubes 39 which direct coins to a coin receptacle station(s) 40. In at least some aspects, a plurality of tubes 39 are provided and advantageously are positioned to direct coins of specified denominations to designated coin receptacles. The currency processing machine 10 may include more or fewer than the modules illustrated in FIG. 2, such as a coin packaging module or a note packaging module.

The currency processing machine 10 includes a controller 38 which is coupled to each module within the currency processing machine 10, and optionally to an external system, and controls the interaction between each module. For example, the controller 38 may review the input totals from the funds processing modules 30 and 32 and direct an appropriate funds output via the funds dispensing modules 34 and 36. The controller 38 also directs the operation of the coin receptacle station 40 as described below. While not shown, the controller 38 is also coupled to the other peripheral components of the currency processing machine 10, such as a media reader associated with the media reader slot 24 and also to a printer at the receipt dispenser 26, if these devices are present on the coin processing mechanism 10. The controller 38 may be in the nature of a central processing unit (CPU) connected to a memory device. The controller 38 may include any suitable processor, processors and/or microprocessors, including master processors, slave processors, and secondary or parallel processors. The controller 38 may comprise any suitable combination of hardware, software, or firmware disposed inside and/or outside of the housing 11.

Figure 3:
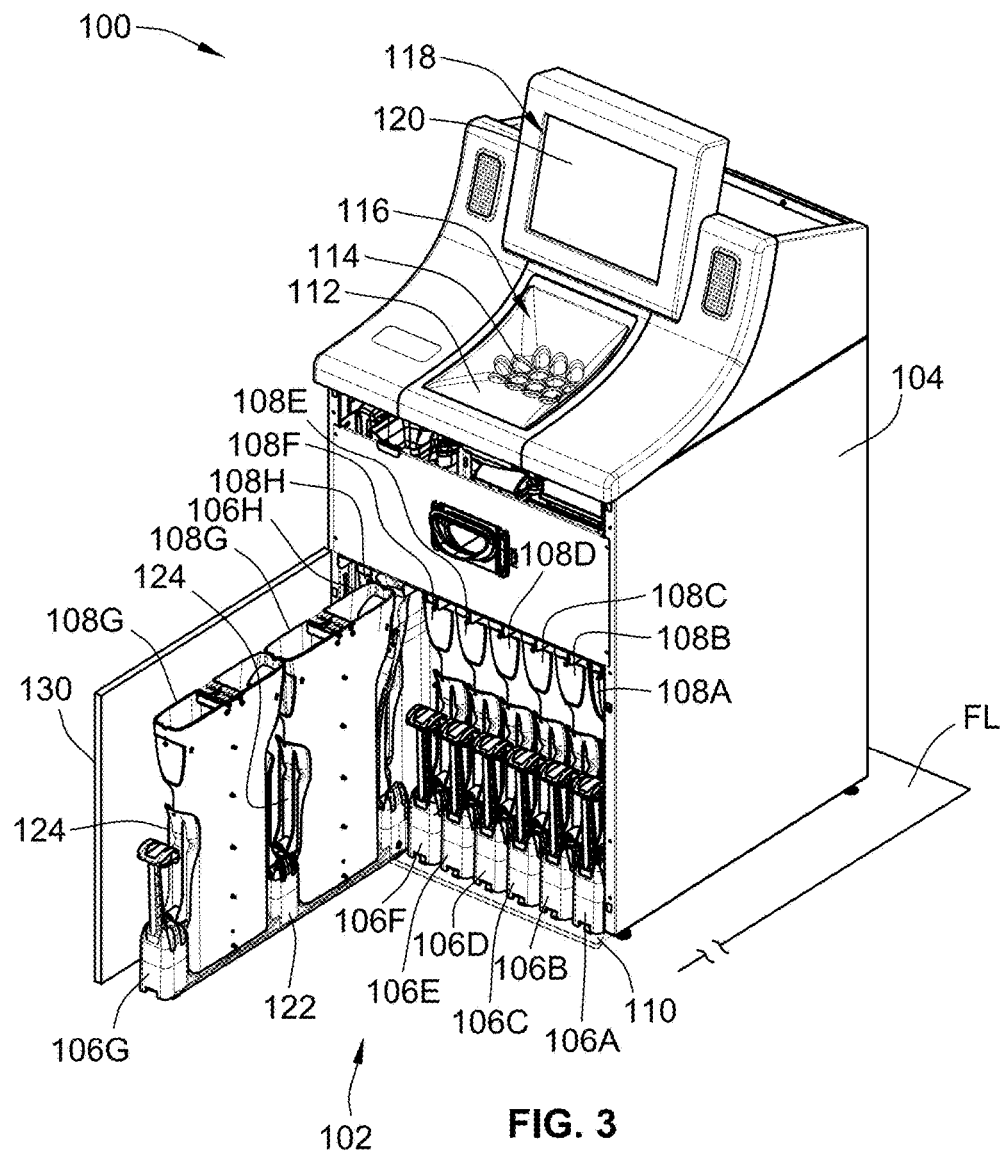
FIG. 3 is a front perspective-view illustration of an example of a coin processing machine in accordance with aspects of the present disclosure.

Another example of a currency processing system is illustrated in accordance with aspects of this disclosure in FIG. 3, this time represented by a coin processing machine 100. The coin processing machine 100 has a coin tray 112 that holds coins prior to and/or during inputting some or all of the coins in the coin tray 112 into the coin processing machine 100. The coin tray 112 may be configured to transfer coins deposited thereon, e.g., by pivoting upwards and/or by downwardly sloping coin surfaces, to a coin sorting mechanism (not visible in FIG. 3; may correspond to coin processing unit 200 of FIG. 4) disposed within a cabinet or housing 104. The coins are transferred from the coin tray 112 to the sorting mechanism, under the force of gravity, via a funnel arrangement 114 formed in a coin input area 116 of the cabinet 104. Once processed, the coin sorting mechanism discharges sorted coins to a plurality of coin bags or other coin receptacles that are housed within the cabinet (or "housing") 104.

A user interface 118 interacts with a controller (e.g., controller 38 of FIG. 2) of the coin processing machine 100. The controller is operable, in at least some embodiments, to control the initiation and termination of coin processing, to determine the coin totals during sorting, to validate the coins, and to calculate or otherwise determine pertinent data regarding the sorted coins. The user interface 118 of FIG. 3 includes a display device 120 for displaying information to an operator of the coin processing machine 100. Like the display device 12 illustrated in FIG. 1, the display device 120 of FIG. 3 may also be capable of receiving inputs from an operator of the coin processing machine 100, e.g., via a touchscreen interface. Inputs from an operator of the coin processing machine 100 can include selection of predefined modes of operation, instructions for defining modes of operation, requests for certain outputs to be displayed on the display device 120 and/or a printer (not shown), identification information, such as an identification code for identifying particular transactions or batches of coins, etc.

During an exemplary batch sorting operation, an operator dumps a batch of mixed coins into the coin tray 112 and inputs an identification number along with any requisite information via the interface 118. The operator (or the machine 100) then transfers some or all of the coins within the coin tray 112 to the sorting mechanism through the coin input area 116 of the cabinet 104. Coin processing may be initiated automatically by the machine 100 or in response to a user input. While the coins are being sorted, the operator can deposit the next batch of coins into the coin tray 112 and enter data corresponding to the next batch. The total value of each processed (e.g., sorted, denominated and authenticated) batch of coins can be redeemed, for example, via a printed receipt or any of the other means disclosed herein.

The coin processing machine 100 has a coin receptacle station 102 disposed within the housing 104. When the coin processing machine 100 is disposed in a retail setting or other publicly accessible environment, e.g., for use as a retail coin redemption machine, the coin receptacle station 102 can be secured inside housing 104, e.g., via a locking mechanism, to prevent unauthorized access to the processed coins. The coin receptacle station 102 includes a plurality of moveable coin-receptacle platforms 106A-H ("moveable platforms"), each of which has one or more respective coin receptacles 108A-H disposed thereon. Each moveable platform 106A-H is slidably attached to a base 110, which may be disposed on the ground beneath the coin processing machine 100, may be mounted to the coin processing machine 100 inside the housing 104, or a combination thereof. In the illustrated embodiment, the coin receptacle station 102 includes eight moveable coin-receptacle platforms 106A-H, each of which supports two coin receptacles 108A-H, such that the coin processing machine 100 accommodates as many as sixteen individual receptacles. Recognizably, the coin processing machine 100 may accommodate greater or fewer than sixteen receptacles that are supported on greater or fewer than eight coin-receptacle platforms.

The coin receptacles 108A-H of the illustrated coin receptacle station 102 are designed to accommodate coin bags. Alternative variations may be designed to accommodate coin cassettes, cashboxes, coin bins, etc. Alternatively still, the moveable platforms 106A-H may have more than one type of receptacle disposed thereon. In normal operation, each of the coin receptacles 108A-H acts as a sleeve that is placed inside of a coin bag to keep coins within a designated volume during filling of the coin bag. In effect, each coin receptacle 108A-H acts as an internal armature, providing an otherwise non-rigid coin bag with a generally rigid internal geometry. Each of the platforms 106A-H includes a coin bag partition 122 that separates adjacent coin bags from one another for preventing coin bags from contacting adjacent coin bags and disrupting the flow of coins into the coin bags. For other embodiments, each moveable platform 106A-H may include multiple partitions 122 to accommodate three or more coin receptacles 108A-H. The moveable platforms 106A-H also include bag clamping mechanisms 124 for each of the coin receptacles 108A-H. Each bag clamping mechanism 124 operatively positions the coin bag for receiving processed coins, and provides structural support to the coin receptacle 108A-H when the moveable platform 106A-H is moved in and out of the machine.

The number of moveable platforms 106A-H incorporated into the coin processing machine 100 can correspond to the number of coin denominations to be processed. For example, in the U.S. coin set: pennies can be directed to the first coin receptacles 108A disposed on the first moveable platform 106A, nickels can be directed to the second coin receptacles 108B disposed on the second moveable platform 106B, dimes can be directed to the third coin receptacles 108C disposed on the third moveable platform 106C, quarters can be directed to the fourth coin receptacles 108D disposed on the fourth moveable platform 106D, half-dollar coins can be directed to the fifth coin receptacles 108E disposed on the fifth moveable platform 106E, dollar coins can be directed to the sixth coin receptacles 108F disposed on the sixth moveable platform 106F. The seventh and/or eighth moveable platforms 106G, 106H can be configured to receive coin overflow, invalid coins, or other rejected coins. Optionally, coins can be routed to the coin receptacles 108A-H in any of a variety of different manners. For example, in the illustrated configuration, if the operator of the coin processing machine 100 is anticipating a larger number of quarters than the other coin denominations, three or more of the coin receptacles 108A-H on the moveable platforms 106A-H may be dedicated to receiving quarters. Alternatively, half-dollar coins and dollar coins, of which there are fewer in circulation and regular use than the other coin denominations, can each be routed to a single dedicated coin receptacle.

In operation, an operator of the coin processing machine 100 who desires to access one or more of the coin receptacles 108A-H unlocks and opens a front door 130 of the housing 104 to access the coin receptacle station 102. Depending on which coin receptacle(s) the operator needs to empty, for example, the operator slides or otherwise moves one of the moveable coin-receptacle platforms 106A-H from a first "stowed" position inside the housing 104 (e.g., moveable platform 106A in FIG. 3) to a second "extracted" position outside of the housing 104 (e.g., moveable platform 106G in FIG. 3). If any of the coin bags are filled and need to be replaced, the operator may remove filled coin bags from the extracted movable platform, replace the filled coin bags with empty coin bags, return the movable platform to the stowed position, and subsequently shut and lock the front door 130.

Figure 4:
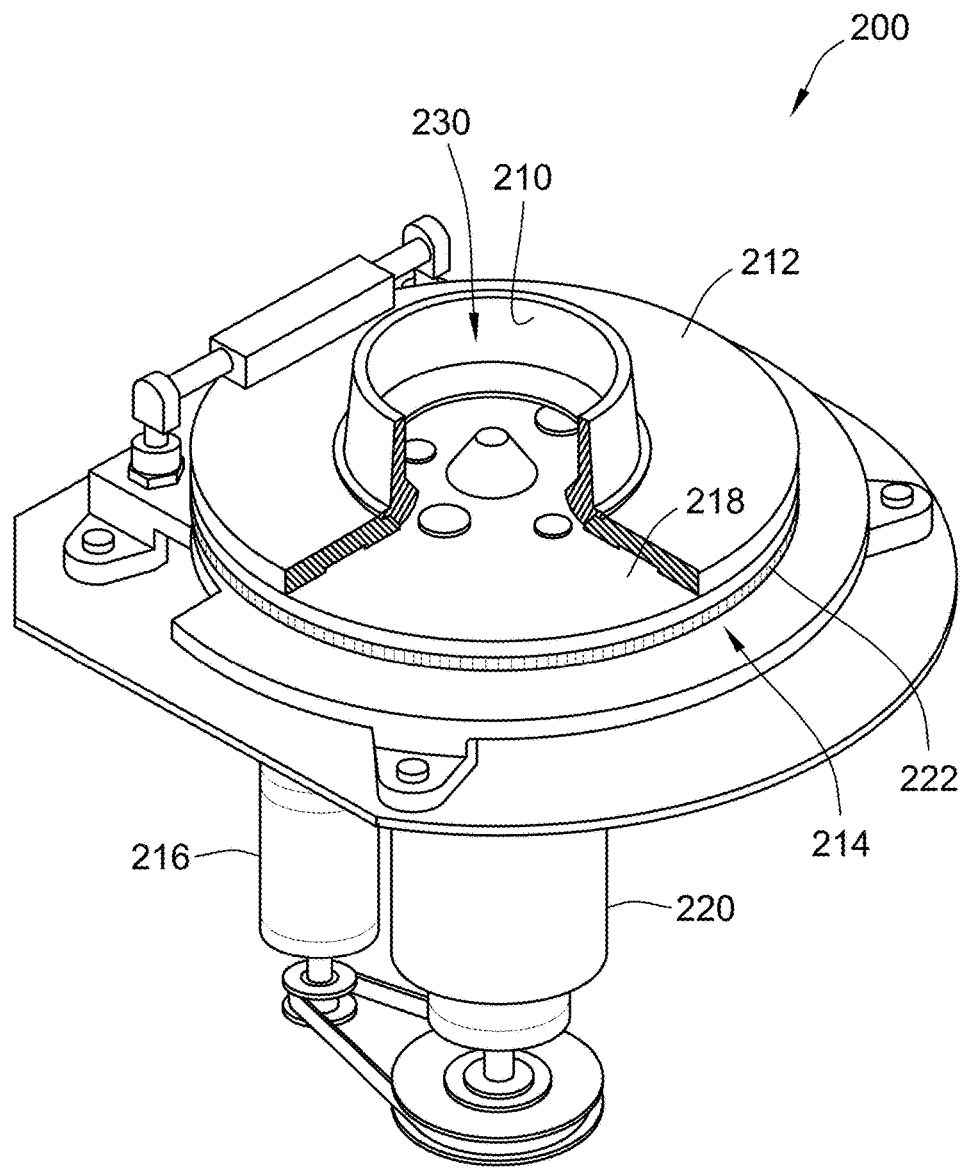
FIG. 4 is a partially broken away perspective-view illustration of an example of a disk-type coin processing unit in accordance with aspects of the present disclosure.

FIG. 4 shows a non-limiting example of a coin sorting device, represented herein by a disk-type coin processing unit 200 that can be used in any of the currency processing systems, methods and devices disclosed herein. The coin processing unit 200 includes a hopper channel, a portion of which is shown at 210, for receiving coins of mixed denominations from a coin input area (e.g., coin input areas 14 or 116 of FIGS. 1 and 3). The hopper channel 210 feeds the coins through a central opening 230 in an annular, stationary sorting head 212. As the coins pass through this opening, the coins are deposited onto the top surface of a resilient pad 218 disposed on a rotatable disk 214. According to some embodiments, coins are initially deposited by a user onto a coin tray (e.g., coin tray 112 of FIG. 3) disposed above the coin processing unit 200; coins flow from the coin tray into the hopper channel 210 under the force of gravity.

This rotatable disk 214 is mounted for rotation on a shaft (not visible) and driven by an electric motor 216. The rotation of the rotatable disk 214 of FIG. 4 is slowed and stopped by a braking mechanism 220. The disk 214 typically comprises a resilient pad 218, preferably made of a resilient rubber or polymeric material, that is bonded to, fastened on, or integrally formed with the top surface of a solid disk 222. The resilient pad 218 may be compressible such that coins laying on the top surface thereof are biased or otherwise pressed upwardly against the bottom surface of the sorting head 212 as the rotatable disk 214 rotates. The solid disk 222 is typically fabricated from metal, but it can also be made of other materials, such as a rigid polymeric material.

The underside of the inner periphery of the sorting head 212 is spaced above the pad 218 by a distance which is approximately the same as or, in some embodiments, just slightly less than the thickness of the thinnest coin. While the disk 214 rotates, coins deposited on the resilient pad 218 tend to slide outwardly over the top surface of the pad 218 due to centrifugal force. As the coins continue to move outwardly, those coins that are lying flat on the pad 218 enter a gap between the upper surface of the pad 218 and the lower surface of the sorting head 212. As is described in further detail below, the sorting head 212 includes a plurality of coin directing channels (also referred to herein as "exit channels") for manipulating the movement of the coins from an entry area to a plurality of exit stations (or "exit slot") where the coins are discharged from the coin processing unit 200. The coin directing channels may sort the coins into their respective denominations and discharge the coins from exit stations in the sorting head 212 corresponding to their denominations.

Figure 5:
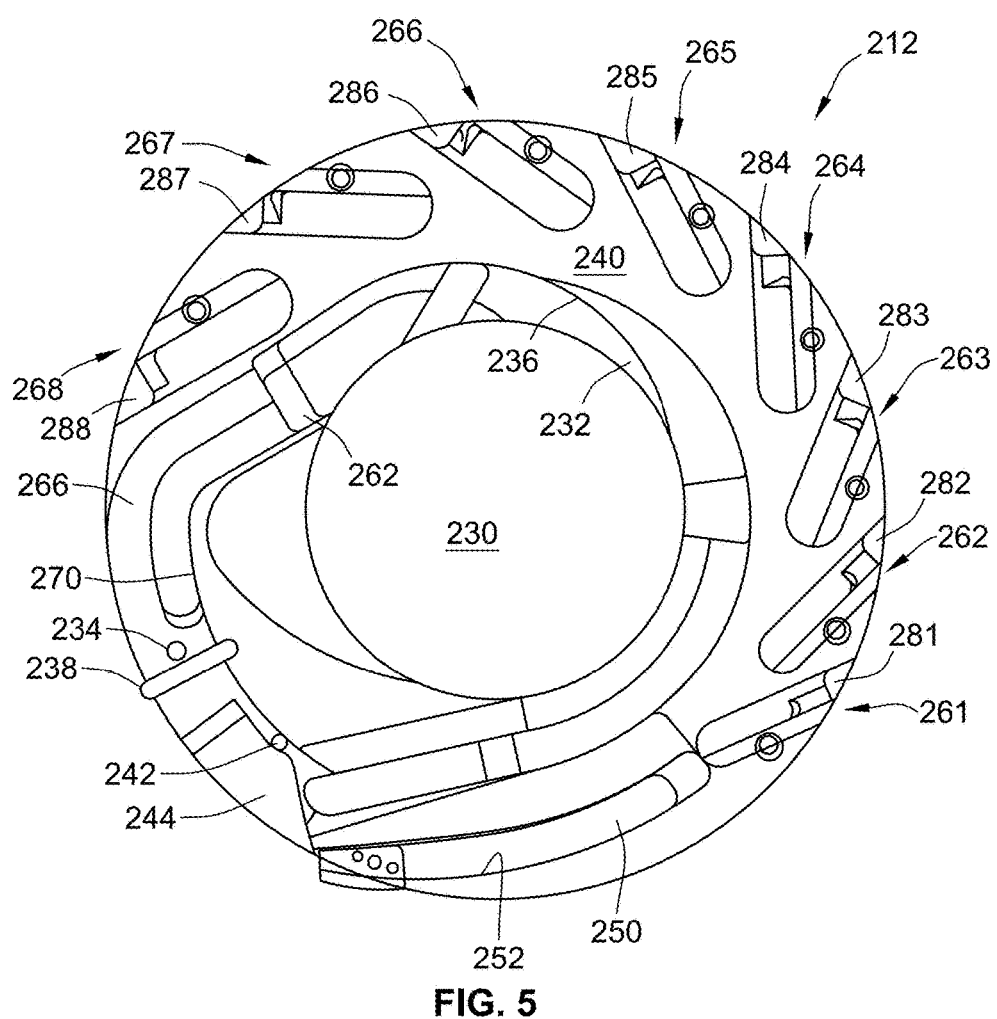
FIG. 5 is an enlarged bottom-view illustration of the sorting head of the exemplary disk-type coin processing unit of FIG. 4.

Referring now to FIG. 5, the underside of the sorting head 212 is shown. The coin set for a given country can be sorted by the sorting head 212 due to variations in the diameter and/or thickness of the individual coin denominations. For example, according to the United States Mint, the U.S. coin set has the following diameters:

Penny=0.750 in. (19.05 mm)
Nickel=0.835 in. (21.21 mm)
Dime=0.705 in. (17.91 mm)
Quarter=0.955 in. (24.26 mm)
Half Dollar=1.205 in. (30.61 mm)
Presidential One Dollar=1.043 in. (26.49 mm)

The coins circulate between the stationary sorting head 212 and the rotating pad 218 on the rotatable disk 214, as shown in FIG. 4. Coins that are deposited on the pad 218 via the central opening 230 initially enter an entry channel 232 formed in the underside of the sorting head 212. It should be kept in mind that the circulation of the coins in FIG. 5 appears counterclockwise as FIG. 5 is a view of the underside of the sorting head 212.

An outer wall 236 of the entry channel 232 divides the entry channel 232 from the lowermost surface 240 of the sorting head 212. The lowermost surface 240 is preferably spaced from the pad 218 by a distance that is slightly less than the thickness of the thinnest coins. Consequently, the initial outward radial movement of all the coins is terminated when the coins engage the outer wall 236, although the coins continue to move more circumferentially along the wall 236 (e.g., in a counterclockwise direction in FIG. 5) by the rotational movement imparted to the coins by the pad 218 of the rotatable disk 214.

While the pad 218 continues to rotate, those coins that were initially aligned along the wall 236 move across the ramp 262 leading to a queuing channel 266 for aligning the innermost edge of each coin along an inner queuing wall 270. The coins are gripped between the queuing channel 266 and the pad 218 as the coins are rotated through the queuing channel 266. The coins, which were initially aligned with the outer wall 236 of the entry channel 232 as the coins move across the ramp 262 and into the queuing channel 266, are rotated into engagement with inner queuing wall 270. As the pad 218 continues to rotate, the coins which are being positively driven by the pad move through the queuing channel 266 along the queuing wall 270 past a trigger sensor 234 and a discrimination sensor 238, which may be operable for discriminating between valid and invalid coins. In some embodiments, the discrimination sensor 238 may also be operable to determine the denomination of passing coins. The trigger sensor 234 sends a signal to the discrimination sensor 238 that a coin is approaching.

In the illustrated example, coins determined to be invalid are rejected by a diverting pin 242 that is lowered into the coin path such that the pin 242 impacts the invalid coin and thereby redirects the invalid coin to a reject channel 244. In some embodiments, the reject channel 244 guides the rejected coins to a reject chute that returns the coin to the user (e.g., rejected coins ejected into the coin reject tube 33 to the coin dispensing receptacle 22 of FIG. 1). The diverting pin 242 depicted in FIG. 5 remains in a retracted "non-diverting" position until an invalid coin is detected. Those coins not diverted into the reject channel 244 continue along inner queuing wall 270 to a gauging region 250. The inner queuing wall 270 terminates just downstream of the reject channel 244; thus, the coins no longer abut the inner queuing wall 270 at this point and the queuing channel 266 terminates. The radial position of the coins is maintained, because the coins remain under pad pressure, until the coins contact an outer wall 252 of the gauging region 250.

The gauging wall 252 aligns the coins along a common outer radius as the coins approach a series of coin exit channels 261-268 which discharge coins of different denominations through corresponding exit stations 281-288. The first exit channel 261 is dedicated to the smallest coin to be sorted (e.g., the dime in the U.S. coin set). Beyond the first exit channel 261, the sorting head 212 shown in FIGS. 4 and 5 forms seven more exit channels 262-268 which discharge coins of different denominations at different circumferential locations around the periphery of the sorting head 212. Thus, the exit channels 261-268 are spaced circumferentially around the outer periphery of the sorting head 212 with the innermost edges of successive channels located progressively closer to the center of the sorting head 212 so that coins are discharged in the order of increasing diameter. The number of exit channels can vary according to alternative embodiments of the present disclosure.

The innermost edges of the exit channels 261-268 are positioned so that the inner edge of a coin of only one particular denomination can enter each channel 261-268. The coins of all other denominations reaching a given exit channel extend inwardly beyond the innermost edge of that particular exit channel so that those coins cannot enter the channel and, therefore, continue on to the next exit channel under the circumferential movement imparted on them by the pad 218. To maintain a constant radial position of the coins, the pad 218 continues to exert pressure on the coins as they move between successive exit channels 261-268.

Further details of the operation of the sorting head 212 shown in FIGS. 4 and 5 are disclosed in U.S. Patent Application Publication No. US 2003/0168309 A1, which is incorporated herein by reference in its entirety. Other disk-type coin processing devices and related features that may be suitable for use with the coin processing devices disclosed herein are shown in U.S. Pat. Nos. 6,755,730; 6,637,576; 6,612,921; 6,039,644; 5,997,395; 5,865,673; 5,782,686; 5,743,373; 5,630,494; 5,538,468; 5,507,379; 5,489,237; 5,474,495; 5,429,550; 5,382,191; and 5,209,696, each of which is incorporated herein by reference in its entirety and for all purposes. In addition, U.S. Pat. Nos. 7,188,720 B2, 6,996,263 B2, 6,896,118 B2, 6,892,871 B2, 6,810,137 B2, 6,748,101 B1, 6,731,786 B2, 6,724,926 B2, 6,678,401 B2, 6,637,576 B1, 6,609,604, 6,603,872 B2, 6,579,165 B2, 6,318,537 B1, 6,171,182 B1, 6,068,194, 6,042,470, 6,039, 645, 6,021,883, 5,982,918, 5,943,655, 5,905,810, 5,564,974, and 4,543,969, and U.S. Patent Application Publication Nos. 2007/0119681 A1 and 2004/0256197 A1, are incorporated herein by reference in their respective entireties and for all purposes.

Figure 6:
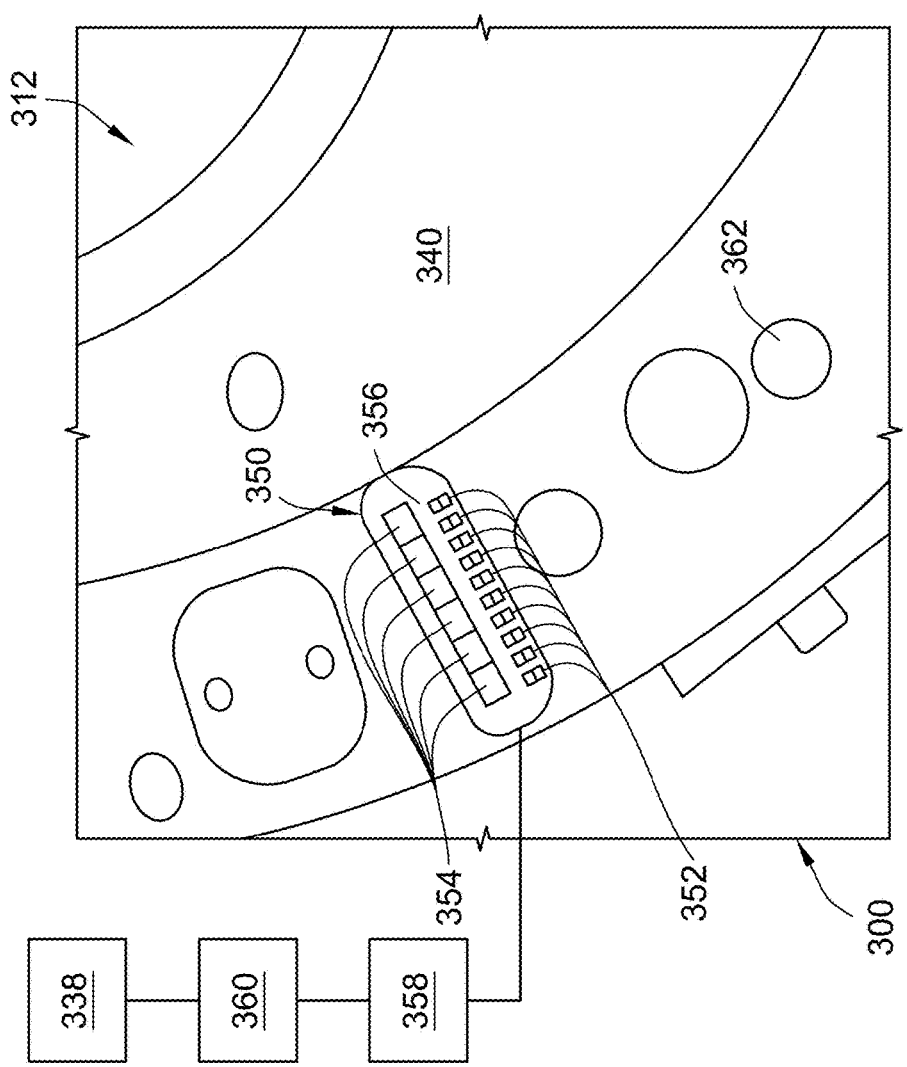
FIG. 6 is an underside perspective-view illustration of the annular sorting head of a disk-type coin processing unit with a representative one-dimensional linear array of coin-imaging sensors, such as capacitive sensors, in accordance with aspects of the present disclosure.

Turning next to FIG. 6, there is shown a coin processing unit, designated generally as 300, for sorting coins, counting coins, authenticating coins, denominating coins, validating coins, and/or any other form of processing coins. As indicated above, the coin processing unit 300 can be incorporated into or otherwise take on any of the various forms, optional configurations, and functional alternatives described herein with respect to the examples shown in FIGS. 1-5, and thus can include any of the corresponding options and features. By way of non-limiting example, the coin processing unit 300 of FIG. 6 may be a disk-type coin processing unit for sorting batches of coins, including batches with coins of mixed denomination, country of origin, etc. The coin processing unit 300 is operatively coupled to the coin input area of a currency processing system (e.g., coin input area 116 of coin processing machine 100) to receive therefrom deposited coins, and is also operatively coupled to one or more coin receptacles (e.g., coin receptacles 108A-H) into which processed coins are deposited. In alternative embodiments, the linear sensor arrays disclosed herein can be incorporated into other types of coin processing apparatuses, such as programmable power rail coin processing devices.

Similar to the disk-type coin processing unit 200 of FIGS. 4 and 5, the coin processing unit 300 of FIG. 6 comprises a rotatable disk (not visible in FIG. 6, but structurally and functionally similar to the rotatable disk 214 of FIG. 4) for supporting on an upper surface thereof and imparting motion to coins received from the coin input area of the currency processing system. Like the configuration illustrated in FIG. 4, the rotatable disk of FIG. 6 can be mounted for common rotation with a drive shaft that is driven by an electric motor. A stationary sorting head 312, which is adjacent the rotatable disk, has a lower surface 340 that is located generally parallel to and spaced slightly apart from the top surface of the rotatable disk. The lower surface 340 of the sorting head 312 forms a plurality of distinctly shaped regions (or "exit channels"), each of which guides coins of a common diameter, responsive to motion imparted thereto by the rotatable disk, to one of various exit stations through which the coins are discharged from the coin processing unit 300 to the one or more coin receptacles.

A linear array of sensors, designated generally as 350 in FIG. 6, is mounted proximate to or, as shown, directly on and within the sorting head 312 adjacent and, in some embodiments, facing the rotatable disk. The linear array of sensors 350 examines or otherwise senses coins seated on the rotatable disk and outputs a signal indicative of coin image information for each of the processed coins. For some implementations, the linear array 350 consists essentially of a one-dimensional (1D) array of non-optical imaging sensors. By way of non-limiting example, the linear array of sensors 350 includes a row of rectilinearly aligned capacitive imaging sensors for detecting topographic variations or other predetermined characteristics of passing coins. In the embodiments shown in FIG. 6, the linear array 350 includes a row of drive plates 352 aligned parallel to a row of pickup plates 354. Pickup plates 354 and drive plates 352, which lie transverse to the path of travel of passing coins, are separated by one or more sensor gaps 356. As a coin being sensed passes by the coin imaging sensor system 350, a sensor circuit 358 energizes drive plates 354 with drive signals. As surface variations of the imprint on the obverse side or reverse side of the coin passes across the sensor gap(s) 356, the drive signals applied to drive plates 352 are capacitively coupled to pickup plates 354 according to the capacitances of the individual sensor gaps. The capacitance will vary in accordance with the surface variations (e.g., peaks and valleys) of the coin passing across the sensor gap(s) 356. The capacitance variations are measured and stored, for example, in memory device 360 or any other type of computer-readable medium. The memory device 360 can be read, for example, by one or more processors 338 whereby the changes in capacitance can be interpreted, and an image of the topographic variations in the coin can be reconstructed. With the coin image information signals received from the coin imaging sensor system 350, the processor(s) 338 can determine, for example, whether each of the coins is valid or invalid, which may include determining the denomination and/or authenticity of each coin, by comparing the reconstructed coin image to a previously authenticated image that is stored in a library in the memory device 360.

The sorting head 312 may include a cutout into which is seated a coin trigger sensor 362 that is disposed just upstream of the linear sensor array 350. The coin trigger sensor 362 detects the presence of a coin and outputs an activation signal for readying the sensors 350. Coins first move across the coin trigger sensor 362 (e.g., a photo detector or a metal proximity detector), which responsively sends a signal to the processor(s) 338 indicating that a coin is approaching the linear sensor array 350. It is envisioned that the coin processing unit 200 be provided with multiple linear arrays of sensors, for example, to obtain imaging data from both obverse and reverse sides of each passing coin. In this regard, a linear array of sensors could be mounted adjacent the sorting head 312 to obtain imaging data from the edges of passing coins.

Figure 7:
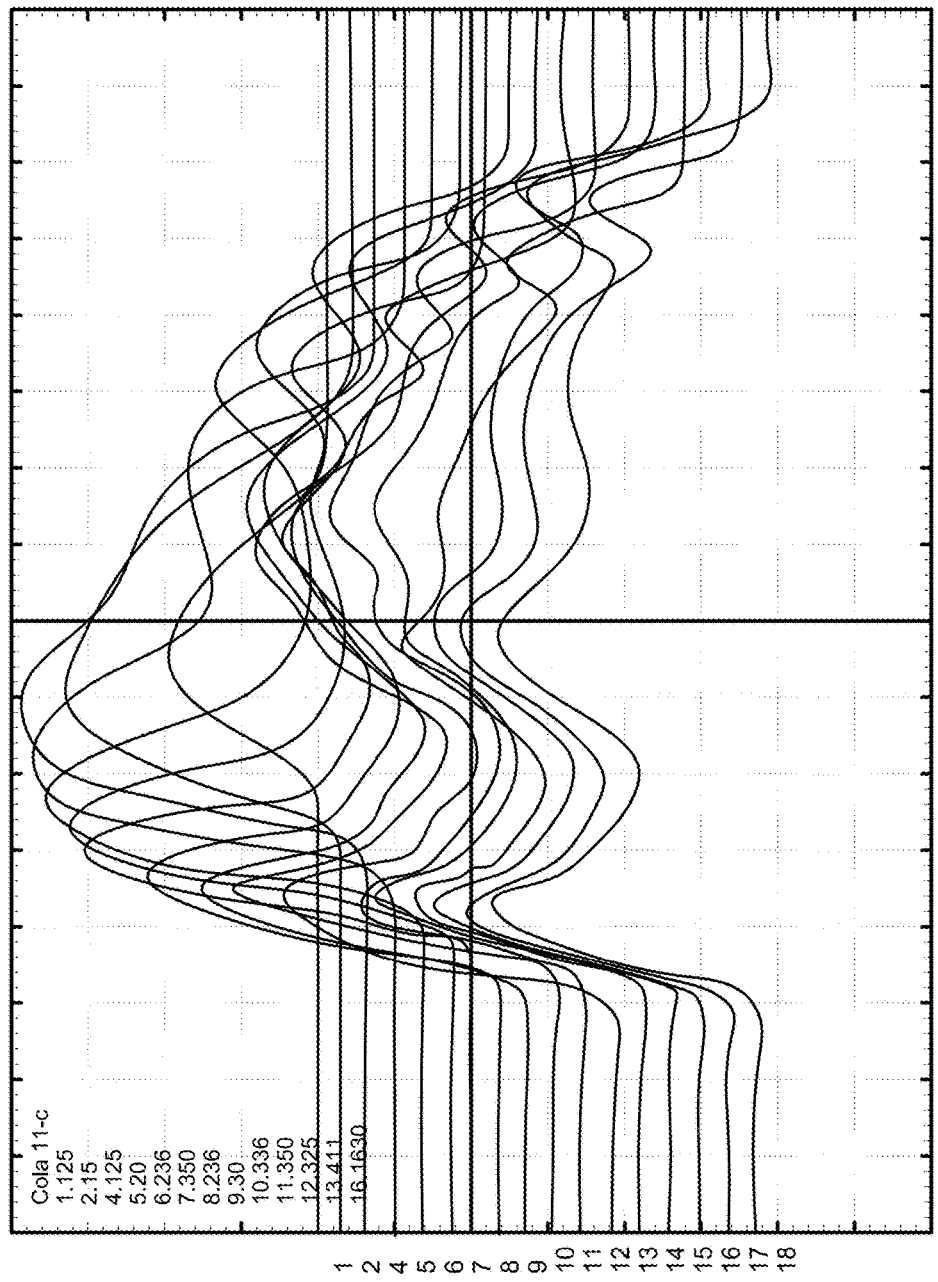
FIG. 7 is an example of a reconstructed image of a coin analyzed with the one-dimensional linear array of coin-imaging sensors of FIG. 6.

FIG. 7 is an example of a reconstructed image of a coin analyzed with the one-dimensional linear array of coin-imaging sensors 350 of FIG. 6. The array 350 allows for the scanning of each coin along multiple chords and generating a trace for each said chord to more effectively and efficiently create a complete and accurate image of the coin. Within each array, a single sensor can act as a trace sensor for detecting information along a single arc. The imaging information detected by the sensor array can be processed by array electronics (e.g., an analog signal filter in the sensor circuit 358) and interpreted by imaging software (e.g., stored in a physical, non-transient computer readable medium associated with the processor(s) 338). In this regard, the image allows for fast and accurate processing of coins, which may include, in any combination, determining denomination, authenticity, and/or validity, detecting if the coin is part of a specific class, identifying locations of any flaws, defects or imperfections, classifying coins as fit or unfit, etc. A linear sensor array, as disclosed herein, can offer a lower cost, simpler, faster and more compact system solution for coin imaging and processing. The use of a linear sensor array can also help to minimize or otherwise eliminate problems associated with spatial averaging as observed in a single "wide" sensor. Such wide sensors lack sufficient resolution and cause spatial blending of coin information. In addition, single channel sensors typically provide information from only a narrow portion of the coin or data on a single characteristic (e.g., the coins electrical impedance). An array of sensors, as disclosed herein, can obtain information from the entire coin regardless of the coin's dimensions, and form an image without inadvertent spatial blending.

Each of the disclosed linear sensor array embodiments may take on a variety of optional and alternative configurations. One such option is illustrated in FIG. 6, for example, wherein the width of the linear array of sensors 350 can be approximately equal to, equal to, or greater than the diameter of the largest coin to be processed (e.g., the U.S. Half Dollar) such that the array is operable to examine all or substantially all of the top surface, bottom surface, or side surface, or a combination thereof, of each passing coin of any denomination. As another option, each sensor in the coin imaging sensor system 350 can carry a single excitation frequency (e.g., 1F) or multiple excitation frequencies (e.g., 4F). Optional configurations of the coin imaging sensor system comprise means to excite passing coins and read the electrical/capacitive response as a "trace," each of which can be measured along the diameter or another chord of the coin. In addition, while the illustrated example of FIG. 6 is shown with only a single array, the coin processing unit 300 may further comprise a second linear array of sensors that is mounted proximate to or directly on or within the sorting head. The second linear array may be generally parallel to and adjacent or interlaced with the first linear array of sensors. The second linear array may take on other locations and orientations. Like the first array, the second sensor array is operable to examine or otherwise sense each passing coin on the rotatable disk and output signals indicative of coin image information for processing the coins. For some embodiments, the disclosed linear sensor arrays allow for processing of coins at a linear speed of at least approximately 50 inches per second (ips), for some embodiments, at a linear speed of at least approximately 300 ips, and, for some embodiments, at a linear speed of at least approximately 400 ips. For some embodiments, the disclosed linear sensor arrays allow for processing of at least approximately 10,000 coins per minute (cpm) and, for some embodiments, at least approximately 15,000 cpm. For some embodiments, the disclosed linear sensor arrays allow for an image resolution of at least approximately 2 dots per inch (dpi) and, for some embodiments, at least approximately 50 dpi or more.

In accord with another aspect of the disclosed concepts, the linear array of sensors may comprise rectilinearly aligned magnetic field or magnetic remanence imaging sensors. Designated generally as 450 in FIG. 8, for example, is a magnetic field imaging sensor array that is mounted on a sorting head 412 of a disk-type coin processing unit 400. Like the linear sensor array 350 of FIG. 6, the sensor array 450 of FIG. 8 consists essentially of a one-dimensional (1D) array of imaging sensors that is operable to examine or otherwise sense coins seated on an adjacent rotatable disk (or other coin transport mechanism) and output a signal indicative of coin image information for processing each of the coins. In the same vein, the sensor array 450 of FIG. 8 can include any of the options and alternatives described above with respect to the sensor array 350. As a non-limiting example, the sensor array 450 may comprise a single linear array of sensing elements or multiple linear arrays of sensing elements that are aligned adjacent one another or interlaced with one another.

Figure 8:
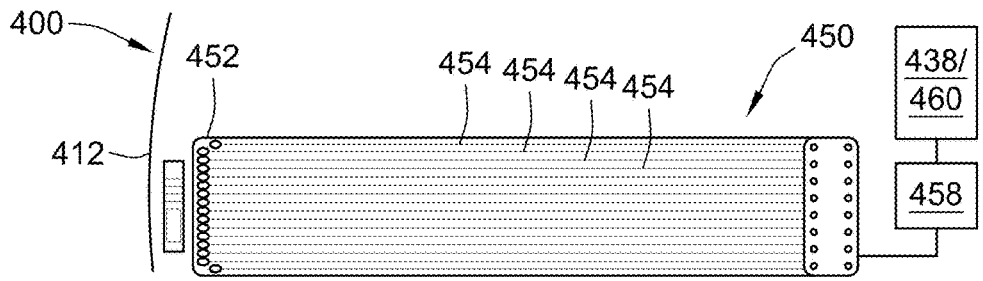
FIG. 8 is a plan-view illustration of an example of a one-dimensional linear array of magnetic in-field coin-imaging sensors in accordance with aspects of the present disclosure.
Figure 9:
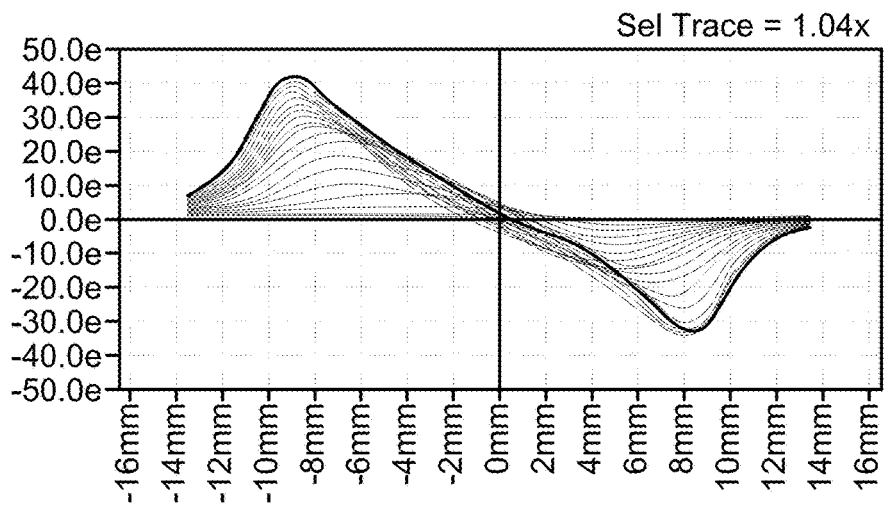
FIGS. 9 and 10 are examples of reconstructed images of coins analyzed with the one-dimensional linear array of magnetic field coin-imaging sensors of FIG. 8.
Figure 10:
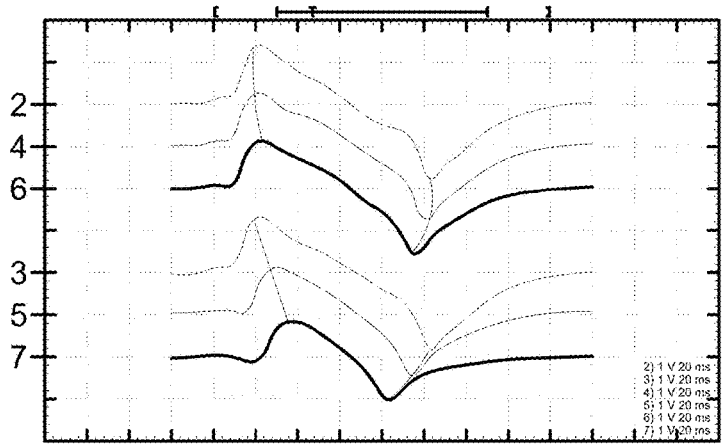

The sensor array 450 of FIG. 8 comprises a substrate 452 with an arrangement of N (where N is a positive integer) spaced-apart magnetic field sensing elements 454 that are supported on the substrate 452. As a coin being sensed passes by the coin imaging sensor system 450, a sensor circuit 458 generates a magnetic field that energizes the coin. Each magnetic field sensing element 454 is capable of measuring a minimum measurable magnetic field at a given frequency. The magnetic field sensing elements 454 may take the form of extraordinary magnetoresistance (EMR) devices or other types of magnetoresistance devices. One or more processors 438 with one or more memory devices 460 process signals from the magnetic field sensing elements 454 to produce an output signal such that the magnetic field sensor is capable of measuring a magnetic field at a given frequency. For some optional and alternative configurations, the imaging sensor array 450 comprises thin film magnetic remanence (MR) type imaging sensors, Hall technology type imaging sensors, magnetic resonance imaging (MM) type sensors, or other magnetic imaging sensor technology. FIGS. 9 and 10 are examples of reconstructed images of coins analyzed with the one-dimensional linear array of magnetic field coin-imaging sensors of FIG. 9.

Figure 11:
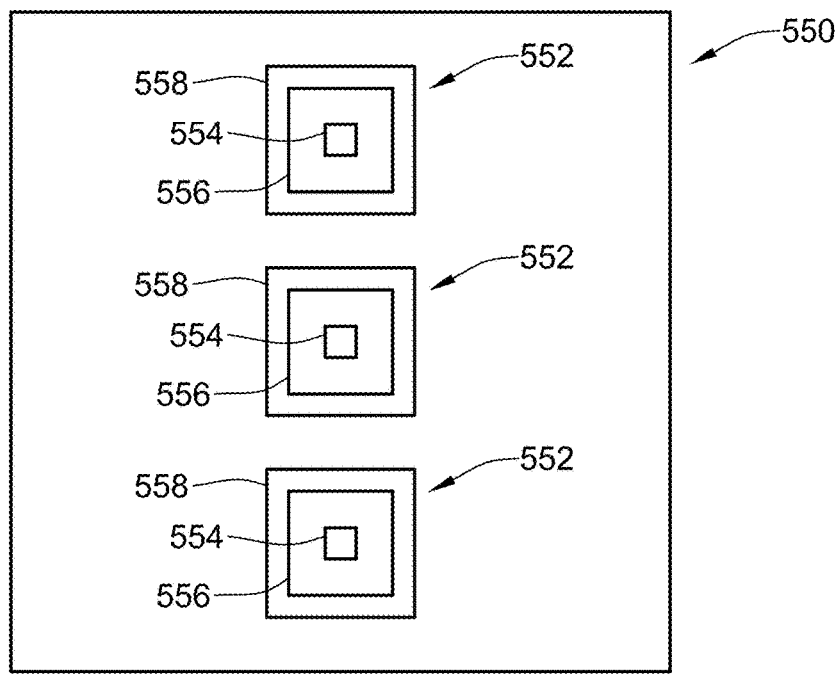
FIG. 11 is a schematic illustration of an example of a one-dimensional linear array of electromagnetic coin-imaging sensors in accordance with aspects of the present disclosure.

Turning next to FIG. 11, a one-dimensional linear array of electromagnetic coin-imaging sensors, designated generally as 550, is illustrated in accordance with aspects of the present disclosure. Like the linear sensor arrays 350 of FIG. 6 and 450 of FIG. 8, the sensor array 550 of FIG. 11 consists essentially of a one-dimensional (1D) array of non-optical sensors that is operable to examine or otherwise sense coins seated on an adjacent rotatable disk (or other coin transport mechanism) and output a signal indicative of coin image information for processing each of the coins. In the same vein, the sensor array 550 of FIG. 11 can include any of the options and alternatives described above with respect to the sensor arrays 350 and 450.

Figure 12:
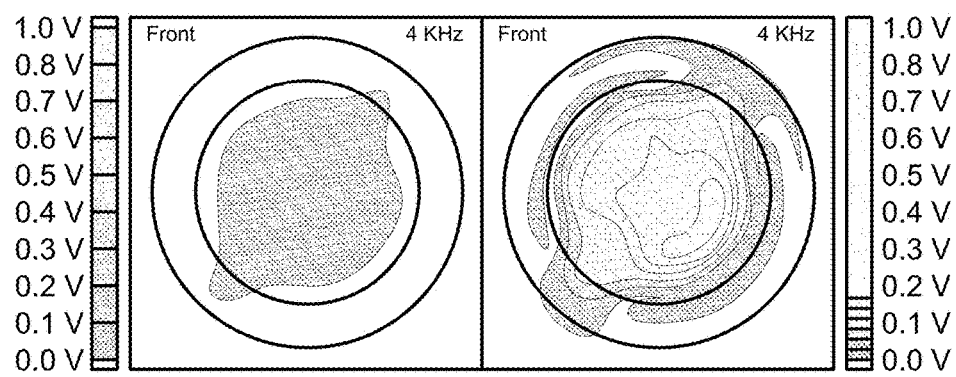
FIG. 12 is an example of a raster scan of a coin analyzed with the one-dimensional linear array of electromagnetic coin-imaging sensors of FIG. 11.

In the illustrated example, the linear sensor array 550 includes a plurality of electromagnetic imaging sensors 552, each of which comprises a ferromagnetic core 554, a primary coil 556, and a secondary coil 558. The primary coil 556 is wound around a first portion of the core 554 for driving a low frequency signal, and the secondary coil 558 is wound around a second region of the core 554 for driving a high frequency signal. The primary coil 556 may comprise a larger number of turns and use a smaller gauge wire than the secondary coil 558. Furthermore, the primary and secondary coils 556, 558 are separated from one another by a space therebetween. When an electrical potential or voltage is applied to the coils 556, 558, an oscillating magnetic field is created. As a coin is routed through this oscillating electromagnetic field, various coin properties can be sensed, such as changes in inductance or the amount of energy dissipated (conductivity). These sensed properties are output as electrical signals that can be collected and compared against a library or dataset of predetermined coins having corresponding electromagnetic properties to process the coin. FIG. 12 is an example of a raster scan of a coin analyzed with the electromagnetic linear sensor array 550 of FIG. 11.

In an optional configuration, the linear array comprises a row of optical sensors. For optical imaging, each optical sensor or "pixel" of the array will detect the amount of light being reflected from or transmitted through the sensed object. The resultant image typically depends on the wavelength of the light illuminating the object. By way of contrast, each sensor element of a magnetic array is performing a similar function as the optical "pixel" in the optical array. However, in the case of magnetic arrays, the object is excited with a magnetic field (static or alternating), and the response depends, for example, on the magnetic properties of the coin, the strength and direction of the excitation field, the distance between the sensor and the coin, the and the type of field (AC vs. DC). The pixel size can be very small or can be large. For example, the optical sensor could have an effective resolution from a fraction or a few dpi to thousands of dpi.

While particular embodiments and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of the invention as defined in the appended claims.

What is claimed is:

1. A currency processing system comprising:
    a housing with a coin input area configured to receive a batch of coins;
    one or more coin receptacles operatively coupled to the housing;
    a disk-type coin processing unit operatively coupled to the coin input area and the one or more coin receptacles to transfer coins therebetween, the coin processing unit including:
        a rotatable disk configured to impart motion to a plurality of the coins,
        a sorting head having a lower surface generally parallel to and adjacent the rotatable disk, the lower surface forming a plurality of shaped regions configured to guide the coins, responsive to motion imparted by the rotatable disk, to a plurality of exit stations through which the coins are discharged from the coin processing unit to the one or more coin receptacles, and
        a linear array of sensors mounted to, adjacent or within the sorting head adjacent the rotatable disk, the linear array of sensors being configured to sense each of the coins on the rotatable disk and output a signal indicative of coin image information for processing the coin;
    wherein the disk-type coin processing unit and the linear array of sensors process coins at a rate of at least approximately 10,000 coins per minute (cpm).

2. The currency processing system of claim 1, wherein the linear array of sensors includes a plurality of electromagnetic imaging sensors aligned rectilinearly adjacent one another.

3. The currency processing system of claim 1, wherein the linear array of sensors includes a plurality of magnetic field or remanence imaging sensors aligned rectilinearly adjacent one another.

4. The currency processing system of claim 1, wherein the linear array of sensors includes a plurality of capacitive imaging sensors aligned rectilinearly adjacent one another.

5. The currency processing system of claim 1, wherein the linear array of sensors includes a plurality of ultrasonic imaging sensors aligned rectilinearly adjacent one another.

6. The currency processing system of claim 1, wherein the linear array of sensors includes a plurality of time-decay fluorescence imaging sensors aligned rectilinearly adjacent one another.

7. The currency processing system of claim 1, wherein the linear array of sensors is configured to sense all or substantially all of a top surface of each of the coins.

8. The currency processing system of claim 1, further comprising a processor operatively coupled to the linear array of sensors to receive the coin image information signals and determine therefrom whether each of the coins is valid or invalid.

9. The currency processing system of claim 1, further comprising a processor operatively coupled to the linear array of sensors to receive the coin image information signals and determine therefrom a denomination, a fitness, or an authenticity, or any combination thereof, of each of the coins.

10. The currency processing system of claim 1, wherein the linear array of sensors is mounted in the sorting head, facing the rotatable disk.

11. The currency processing system of claim 1, further comprising an electronics circuit operable to excite each of the coins on the rotatable disk using electric energy, magnetic energy, or electromagnetic energy, wherein the linear array of sensors is operable to capture a response of the excited coin, the coin image information signals being representative of the captured response.

12. The currency processing system of claim 1, wherein the coin image information signal output by the linear array of sensors is sufficient to generate a coin image with a resolution of at least 50 dots per inch (dpi).

13. The currency processing system of claim 1, wherein the disk-type coin processing unit and the linear array of sensors process coins at a rate of at least approximately 15,000 coins per minute (cpm).

14. A coin imaging sensor system for a coin processing apparatus, the coin processing apparatus including a housing with an input area for receiving coins, one or more coin receptacles for stowing processed coins, a coin sorting device for separating coins by denomination, and a coin transport mechanism for transferring coins from the input area, through the coin sorting device, to the one or more coin receptacles, the coin imaging sensor system comprising:
    a linear array of sensors configured to mount inside the housing adjacent the coin transport mechanism upstream of the one or more coin receptacles and downstream from the input area, the linear array of sensors being configured to sense each of the coins and output a signal indicative of coin image information;
    an image processing circuit operatively coupled to the linear array of sensors and configured to process the coin image information signals output therefrom; and
    a processor operatively coupled to the image processing circuit and configured to examine the processed signals and generate therefrom an image for each of the coins;
    wherein the coin processing apparatus and the linear array of sensors process coins at a rate of at least approximately 10,000 coins per minute (cpm).

15. The coin imaging sensor system of claim 14, wherein the coin processing apparatus and the linear array of sensors process coins at a rate of at least approximately 15,000 coins per minute (cpm).

16. A currency processing device comprising:
    a coin input area configured to receive coins;
    at least one coin receptacle configured to receive and stow processed coins;
    a coin processing unit configured to receive coins from the coin input area, process the coins, and output the processed coins to the at least one coin receptacle;
    a linear array of sensors mounted to or adjacent the coin processing unit, the linear array of sensors being configured to sense each of the processed coins and output a signal indicative of coin image information; and at least one processor configured to receive the coin image signals from the linear array of sensors and generate therefrom an image of a surface of each of the coins wherein the coin processing unit and the linear array of sensors process coins at a rate of at least approximately 10,000 coins per minute (cpm).

17. The currency processing device of claim 16, wherein the linear array of sensors includes a plurality of electromagnetic imaging sensors aligned rectilinearly adjacent one another.

18. The currency processing device of claim 16, wherein the linear array of sensors includes a plurality of magnetic field or remanence imaging sensors aligned rectilinearly adjacent one another.

19. The currency processing device of claim 16, wherein the linear array of sensors includes a plurality of capacitive imaging sensors aligned rectilinearly adjacent one another.

20. The currency processing device of claim 16, wherein the linear array of sensors is configured to sense the entire area of a top surface of each of the coins.

21. The currency processing device of claim 16, further comprising an electronics circuit operable to excite each of the coins using electric energy, magnetic energy, or electromagnetic energy, wherein the linear array of sensors is operable to capture a response of the excited coin, the coin image information signals being representative of the captured response.

22. The currency processing device of claim 16, wherein the coin processing unit and the linear array of sensors process coins at a rate of at least approximately 15,000 coins per minute (cpm).

* * * * *